US010670726B2

(12) United States Patent
Suzuki et al.

(10) Patent No.: US 10,670,726 B2
(45) Date of Patent: Jun. 2, 2020

(54) DISTANCE MEASURING DEVICE AND PARALLAX CALCULATION SYSTEM

(71) Applicant: RICOH COMPANY, LTD., Tokyo (JP)

(72) Inventors: Shuichi Suzuki, Kanagawa (JP); Mitsuru Nakajima, Kanagawa (JP); Hiroyoshi Sekiguchi, Kanagawa (JP); Haike Guan, Kanagawa (JP); Soichiro Yokota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 860 days.

(21) Appl. No.: 15/116,399

(22) PCT Filed: Feb. 24, 2015

(86) PCT No.: PCT/JP2015/056018
§ 371 (c)(1),
(2) Date: Aug. 3, 2016

(87) PCT Pub. No.: WO2015/129907
PCT Pub. Date: Sep. 3, 2015

(65) Prior Publication Data
US 2016/0349371 A1    Dec. 1, 2016

(30) Foreign Application Priority Data

Feb. 25, 2014 (JP) .................. 2014-033681
Feb. 19, 2015 (JP) .................. 2015-030368

(51) Int. Cl.
*G01C 3/08*    (2006.01)
*G01S 17/931*    (2020.01)
(Continued)

(52) U.S. Cl.
CPC ............. *G01S 17/931* (2020.01); *G01S 11/12* (2013.01); *G01S 17/10* (2013.01); *G01S 17/86* (2020.01); *G01S 17/42* (2013.01)

(58) Field of Classification Search
CPC ........ G01S 17/89; G01S 17/023; G01S 17/66; G01S 7/4817; G05D 1/0088; G05D 2201/0213
See application file for complete search history.

(56) References Cited

U.S. PATENT DOCUMENTS 5,633,705 A    5/1997  Asayama
6,157,294 A    12/2000 Urai et al.
(Continued)

FOREIGN PATENT DOCUMENTS

DE    102006020391    6/2007
EP    1 378 762 A2    1/2004
(Continued)

OTHER PUBLICATIONS

Partial European Search Report dated Jan. 3, 2017 in Patent Application No. 15755955.0.
(Continued)

*Primary Examiner* — Samantha K Abraham
(74) *Attorney, Agent, or Firm* — Xsensus LLP

(57)    ABSTRACT

A distance measuring device includes a plurality of image taking parts, a first distance information acquisition part that acquires distance information of an object for distance measuring from taken images that are taken by the plurality of image taking parts, an electromagnetic wave emission part that emits an electromagnetic wave, a reflected-wave receiving part that receives a reflected wave of an electromagnetic wave emitted from the electromagnetic wave emission part, and a second distance information acquisition part that acquires distance information of the object for distance measuring from a reflected wave received by the reflected-wave receiving part, wherein irradiation with an electromagnetic wave emitted from the electromagnetic
(Continued)

wave emission part is executed under optical axes of the plurality of image taking parts.

9 Claims, 22 Drawing Sheets

(51) Int. Cl.
  *G01S 17/10* (2020.01)
  *G01S 11/12* (2006.01)
  *G01S 17/86* (2020.01)
  *G01S 17/42* (2006.01)

(56) References Cited

U.S. PATENT DOCUMENTS

| | | | |
|---|---|---|---|
| 6,373,223 B1 | 4/2002 | Anzawa et al. | |
| 7,151,479 B2 | 12/2006 | Beez et al. | |
| 7,499,638 B2 | 3/2009 | Arai et al. | |
| 8,164,305 B2 | 4/2012 | Zhang et al. | |
| 8,605,153 B2 | 12/2013 | Sasaki et al. | |
| 2010/0299109 A1* | 11/2010 | Saito | G01S 11/12 703/1 |
| 2011/0234450 A1 | 9/2011 | Sakai et al. | |
| 2012/0242835 A1 | 9/2012 | Li et al. | |
| 2013/0002203 A1 | 1/2013 | Kuraishi | |
| 2013/0088578 A1 | 4/2013 | Umezawa et al. | |

FOREIGN PATENT DOCUMENTS

| | | |
|---|---|---|
| JP | H03-179210 | 8/1991 |
| JP | 2000-329852 | 11/2000 |
| JP | 2005-077130 | 3/2005 |
| JP | 3630303 | 3/2005 |
| JP | 3669205 | 7/2005 |
| JP | 2008-096123 | 4/2008 |
| JP | 2010-060299 | 3/2010 |
| JP | 2011-083182 | 4/2011 |
| JP | 2013-013268 | 1/2013 |

OTHER PUBLICATIONS

International Search Report dated May 26, 2015 in PCT/JP2015/056018 filed on Feb. 24, 2015.

* cited by examiner

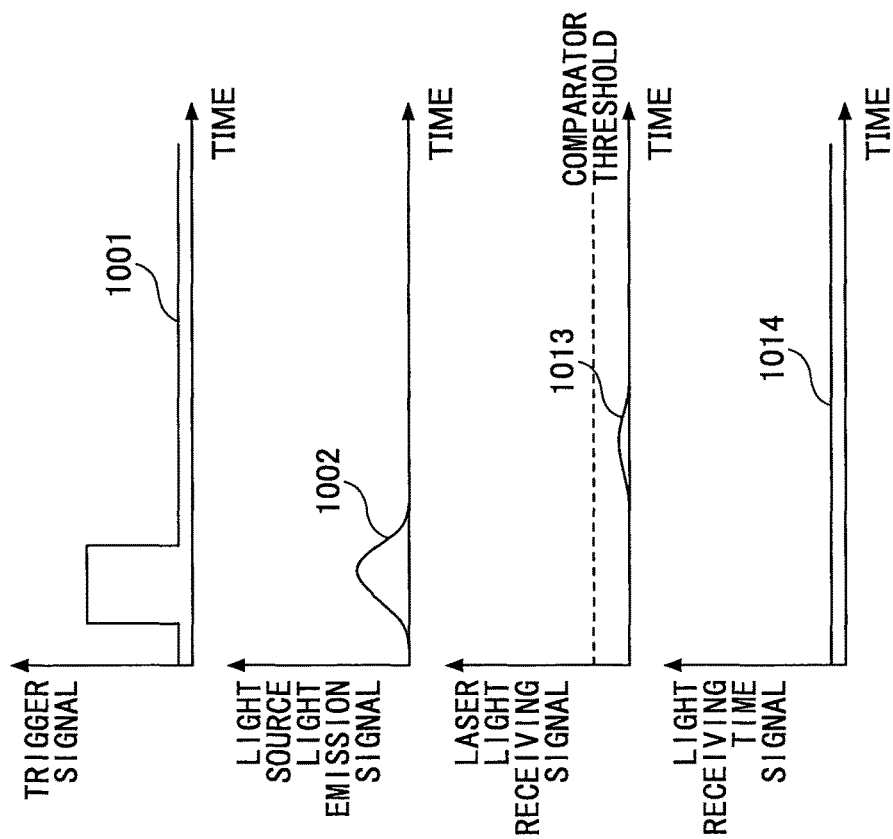
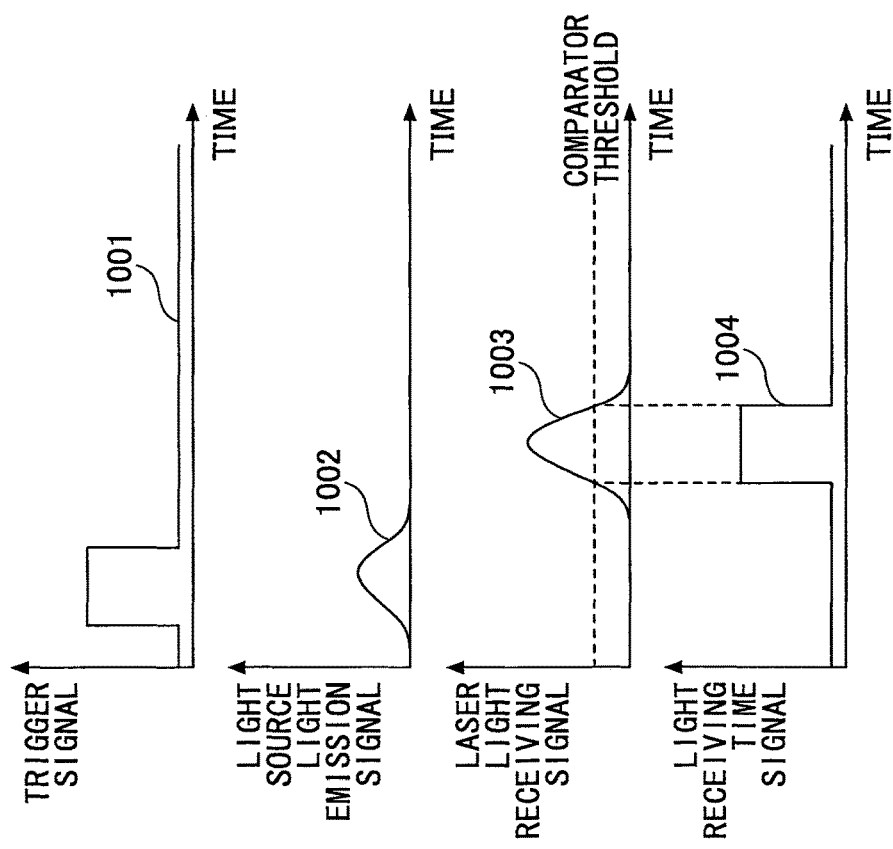
FIG.10A
FIG.10B

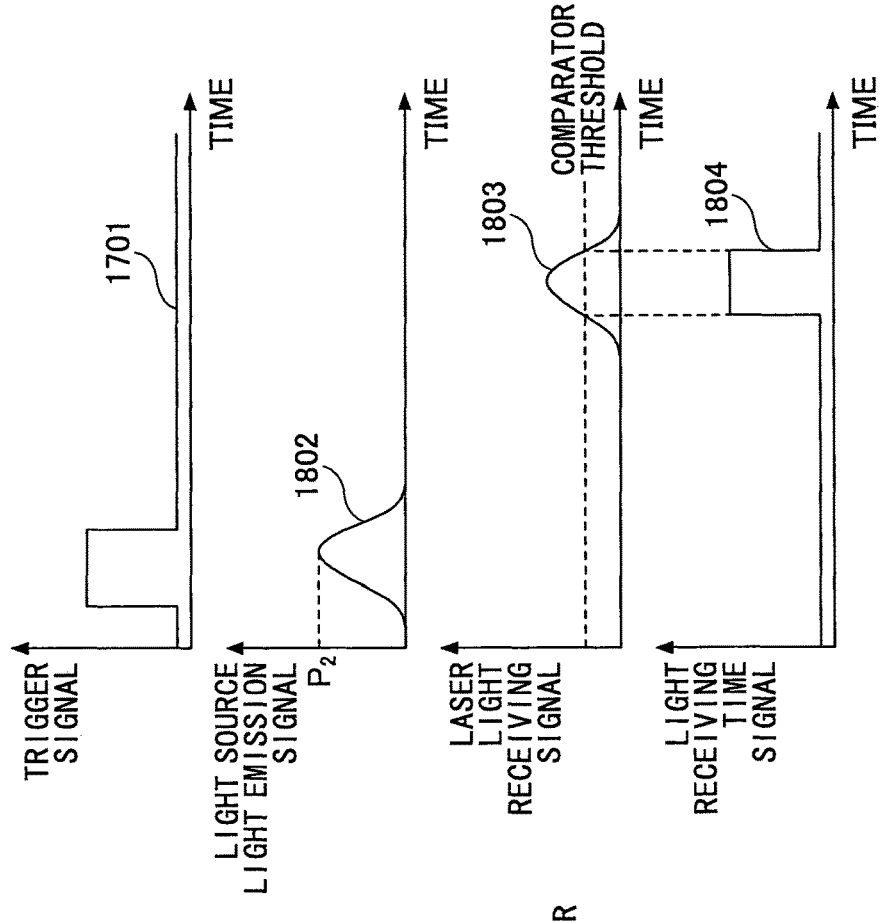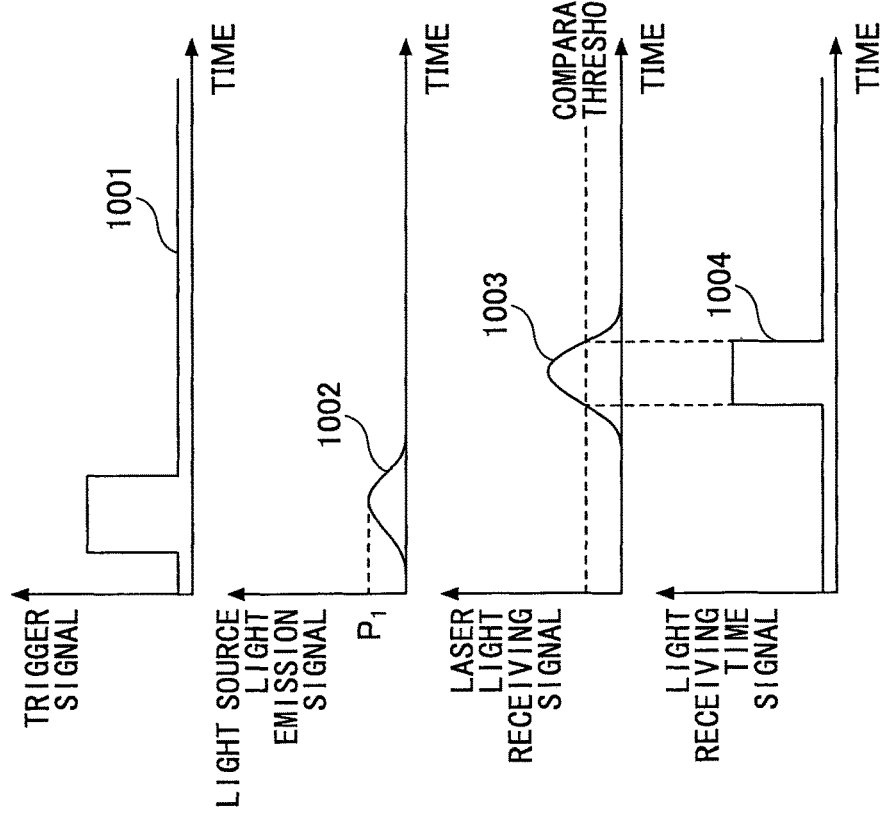
FIG.18A
FIG.18B

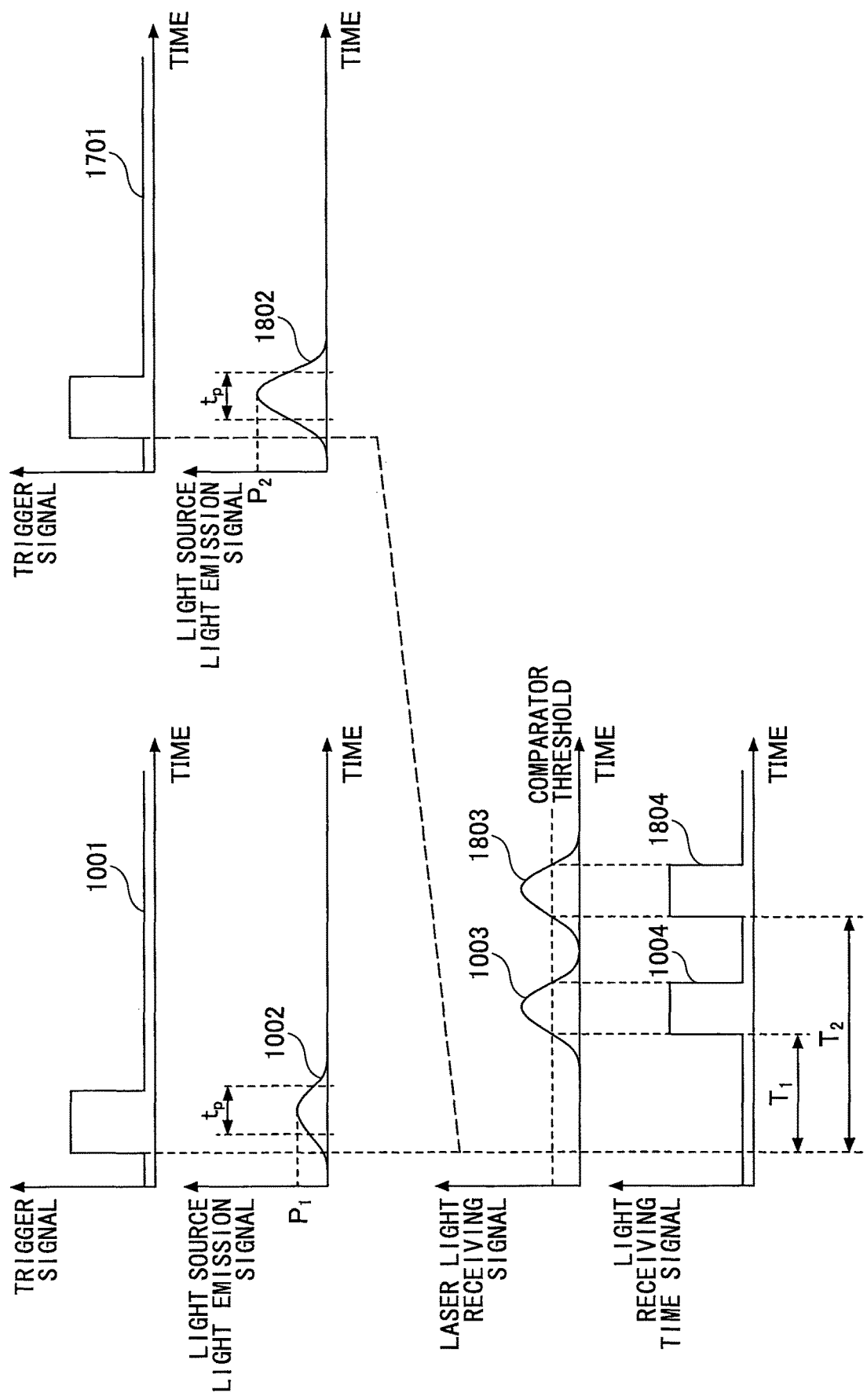

US 10,670,726 B2

DISTANCE MEASURING DEVICE AND PARALLAX CALCULATION SYSTEM

TECHNICAL FIELD

An aspect of the present invention relates to at least one of a distance measuring device and a parallax calculation system.

BACKGROUND ART

A distance measuring technique has conventionally been known wherein parallax calculation is executed for an object that is included in taken images (a stereo image) taken by using a plurality of image taking parts such as a stereo camera so that a distance of such an object is calculated (see, for example, Japanese Patent Application Publication No. 2000-329852).

However, as a repetitive pattern in a lateral direction is included in a stereo image to be subjected to parallax calculation in a case of the distance measuring technique described above, a characteristic is provided such that a frequency of occurrence of an error in parallax calculation is increased.

SUMMARY OF THE INVENTION

According to one aspect of the present invention, there is provided a distance measuring device, including a plurality of image taking parts, a first distance information acquisition part that acquires distance information of an object for distance measuring from taken images that are taken by the plurality of image taking parts, an electromagnetic wave emission part that emits an electromagnetic wave, a reflected-wave receiving part that receives a reflected wave of an electromagnetic wave emitted from the electromagnetic wave emission part, and a second distance information acquisition part that acquires distance information of the object for distance measuring from a reflected wave received by the reflected-wave receiving part, wherein irradiation with an electromagnetic wave emitted from the electromagnetic wave emission part is executed under optical axes of the plurality of image taking parts.

According to another aspect of the present invention, there is provided a parallax calculation system that executes parallax calculation based on taken images that are taken by a plurality of image taking parts, including a measuring part that irradiates with an electromagnetic wave, and receives a reflected wave from, an area as an irradiation object that is rendered as a road image in the taken images by taking images of a road surface positioned in image taking directions for the plurality of image taking parts, and a determination part that determines presence or absence of a road marking in the irradiation object based on a result of receiving in the measuring part, wherein the parallax calculation dependent on a result of determination by the determination part is executed.

BRIEF DESCRIPTION OF THE DRAWINGS

FIG. 10A and FIG. 10B are diagrams that illustrate each signal to be processed in a laser radar distance measuring part at a time of a road measurement process.

FIG. 18A and FIG. 18B are diagrams that illustrate each signal to be processed at a time of a road measurement process in a laser radar distance measuring part that composes a parallax calculation system according to a fifth embodiment.

FIG. 19 is a diagram that illustrates each signal to be processed at a time of a road measurement process in a laser radar distance measuring part that composes a parallax calculation system according to a sixth embodiment.

EMBODIMENTS FOR IMPLEMENTING THE INVENTION

Figure 1:
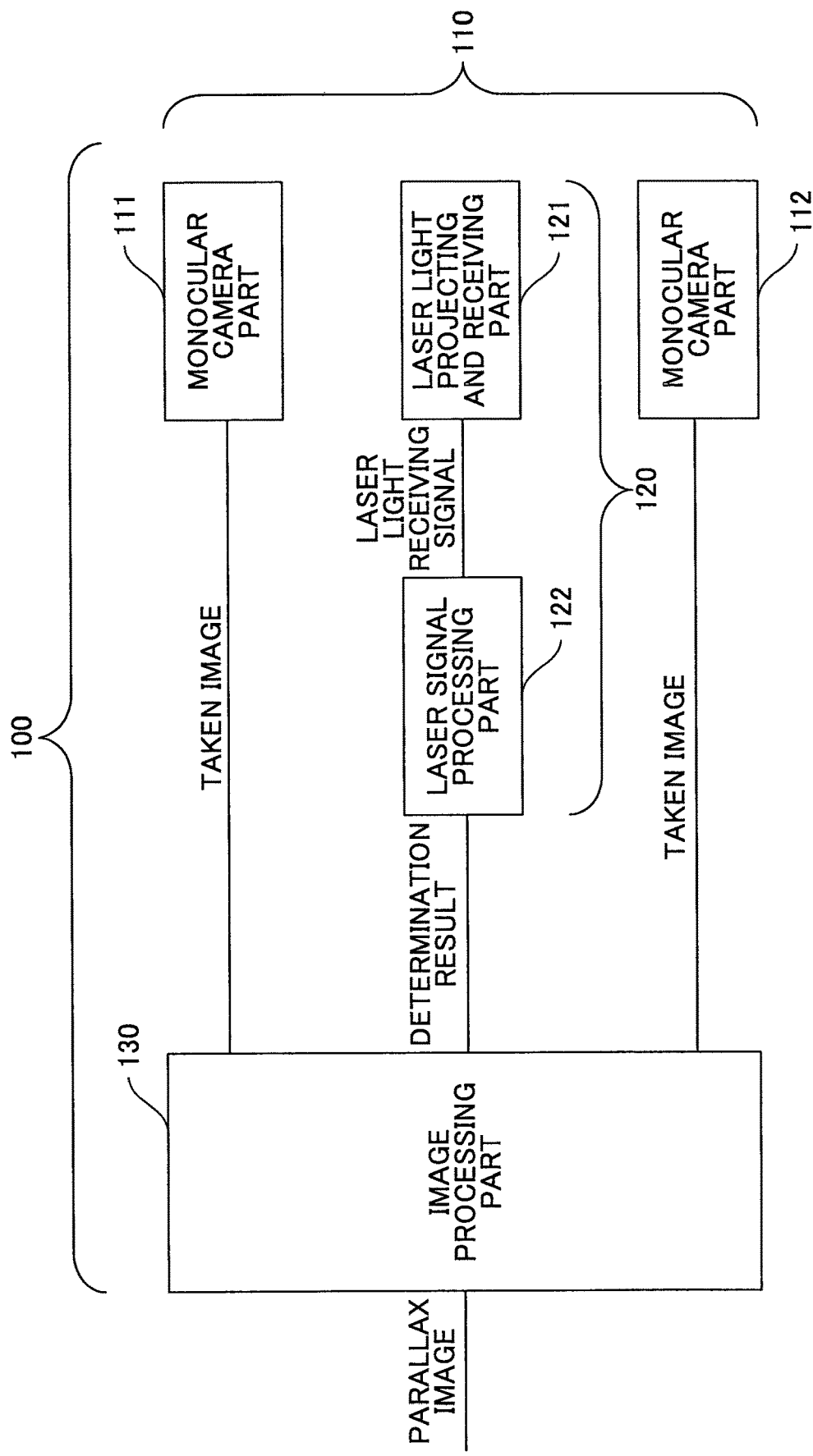
FIG. 1 is a diagram that illustrates a configuration of a parallax calculation system according to an embodiment.

Embodiments of the present invention will be described below, with reference to the accompanying drawings. Here, in the present specification and the drawings, a component that has a substantially identical functional configuration will be provided with an identical reference numeral or letter to omit a redundant description(s).

A First Embodiment

A first embodiment principally solves a problem in that a frequency of occurrence of an error in a parallax calculation is increased in a case where a repetitive pattern in a lateral direction is included on a road.

For a case where a repetitive pattern in a lateral direction is included on a road, it is possible to provide, for example, a case where a road marking of a crosswalk is included. A road marking of a crosswalk is frequently white and drawn with a paint that well reflects light in order to improve visibility, and it is considered that a tendency to increase a frequency of occurrence of an error is particularly high in a case where parallax calculation is executed. The first embodiment will be described below, wherein a road marking of a crosswalk is provided as an example.

<1. An Entire Configuration of a Parallax Calculation System>

First, an entire configuration of a parallax calculation system according to the present embodiment will be described. FIG. 1 is a diagram that illustrates a configuration of a parallax calculation system 100 according to the present embodiment illustrated in FIG. 1, the parallax calculation system 100 is provided with a stereo camera part 110, a laser radar distance measuring part 120, and an image processing part 130.

The stereo camera part 110 is provided with a monocular camera part (an image taking part) 111, and a monocular camera part (an image taking part) 112, and each of the monocular camera parts 111 and 112 executes image taking at a predetermined frame period and transmits a taken image to the image processing part 130.

The laser radar distance measuring part 120 is provided with a laser light projecting and receiving part 121 and a laser signal processing part 122. The laser light projecting and receiving part 121 emits laser light directed in a direction identical to an image taking direction of the stereo camera part 110, and receives reflected light therefrom to output a laser light receiving signal. The laser signal processing part 122 determines presence or absence of a road marking provided on a road, based on a laser light receiving signal output from the laser light projecting and receiving part 121. Furthermore, a result of determination is transmitted to the image processing part 130.

The image processing part 130 uses a taken image transmitted from the stereo camera part 110 to execute a parallax calculation and produce a parallax image. Here, the image processing part 130 uses a result of determination transmitted from the laser radar distance measuring part 120 to execute a parallax calculation. That is, the image processing part 130 is configured to execute a parallax calculation dependent on presence or absence of a road marking (wherein a detail thereof will be described later).

Thus, in the parallax calculation system 100 according to the present embodiment, the laser radar distance measuring part 120 determines presence or absence of a road marking that is a factor of occurrence of an error in parallax calculation and the image processing part 130 executes parallax calculation dependent on presence or absence of a road marking. Thereby, it is possible to reduce a frequency of occurrence of an error in parallax calculation according to the present embodiment.

<2. A Hardware Configuration of a Parallax Calculation System>

Figure 2:
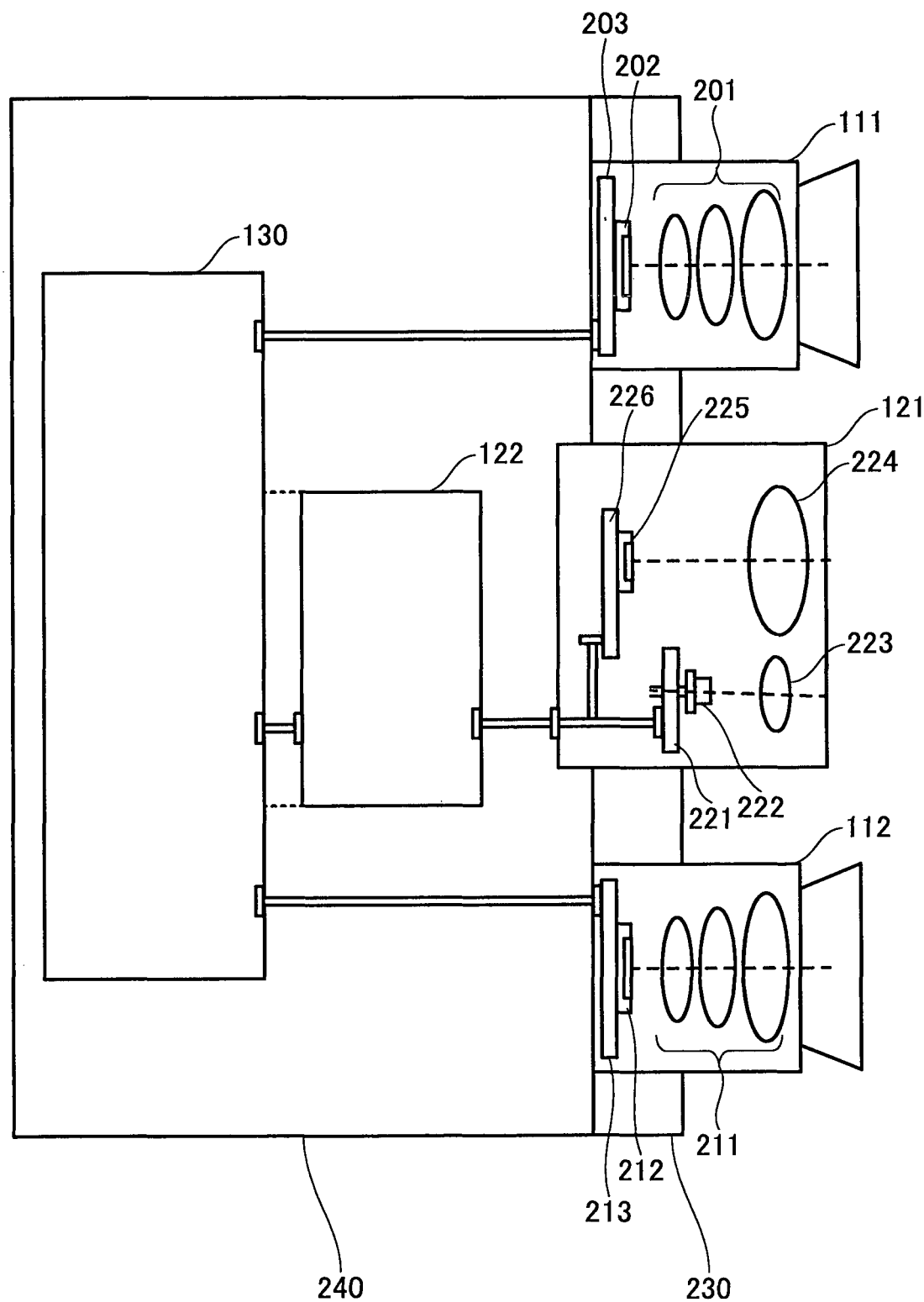
FIG. 2 is a diagram that illustrates a hardware configuration of a parallax calculation system according to an embodiment.

Next, a hardware configuration of the parallax calculation system 100 will be described. FIG. 2 is a diagram that illustrates a hardware configuration of the parallax calculation system 100.

As illustrated in FIG. 2, the parallax calculation system 100 has a camera stay 230 and a control board containment part 240.

The monocular camera parts 111 and 112 and the laser light projecting and receiving part 121 are integrally mounted on the camera stay 230. Thereby, it is possible to miniaturize and reduce cost of the parallax calculation system 100.

The laser signal processing part 122 and the image processing part 130 are contained in the control board containment part 240. The laser signal processing part 122 is configured separately from the laser light projecting and receiving part 121, and thereby, it is possible to reduce a size of the laser light projecting and receiving part 121. Thereby, it is possible to arrange the laser light projecting and receiving part 121 between the monocular camera part 111 and the monocular camera part 112 according to the present embodiment.

Here, although the laser signal processing part 122 and the image processing part 130 are configured as separate circuit boards in an example of FIG. 2, the laser signal processing part 122 and the image processing part 130 may be configured by a common circuit board. That is because the number of circuit boards are reduced and thereby it is possible to attain cost reduction.

As illustrated in FIG. 2, the monocular camera part 111 is provided with a camera lens 201, an image taking element 202, and a sensor board 203. After external light incident on the camera lens 201 is received by the image taking element 202 and photo-electrically converted at a predetermined frame period, a taken image with respect each one frame is produced in the sensor board 203. A produced taken image is sequentially transmitted to the image processing part 130.

Here, the monocular camera part 112 also has a configuration similar to that of the monocular camera part 111 and a taken image produced synchronously with the monocular camera part 111 is sequentially transmitted to the image processing part 130. The image processing part 130 uses a taken image transmitted from the monocular camera parts 111 and 112 to execute parallax calculation and produce a parallax image.

The laser light projecting and receiving part 121 is provided with a light source driving circuit 221, a laser light source 222, and a light projection lens 223. The light source driving circuit 221 operates in accordance with an instruction from the laser signal processing part 122 and applies to modulated electric current (a light source light emission signal) to the laser light source 222. Thereby, the laser light source 222 emits laser light. Laser light emitted from the laser light 222 outgoes to an exterior through the light projection lens 223.

Here, in the present embodiment, an infrared semiconductor laser diode (LD) is used for the laser light source 222 and near-infrared light with a wavelength of 800 nm-950 nm is emitted for laser light. Furthermore, the laser light source 222 is controlled in such a manner that laser light that has a pulsed waveform is periodically emitted depending on modulated electric current (a light source light emission signal) applied by the light source driving circuit 221. Here, the laser light source 222 in the present embodiment is controlled in such a manner that pulsed laser light is periodically emitted that has a small pulse width of about several nanoseconds to several hundred nanoseconds.

Pulsed laser light emitted from the laser light source 222 provides, through the light projection lens 223, a light beam that has a predetermined spread angle, is emitted to exterior as a projection beam, and subsequently, irradiates a predetermined position (a predetermined irradiation object). However, laser light emitted from the laser light source 222 is collimated by the projection lens 223 to provide approximately collimated light, and hence, it is possible to provide an irradiation range at an irradiated position as a preset microscopic surface area.

The laser light projecting and receiving part 121 is further provided with a light receiving lens 224, a light receiving element 225, and a received-light signal amplification circuit 226. Laser light that irradiates a predetermined position is scattered in a uniform direction and only a light component that passes through and is reflected in an optical path identical to that of laser light emitted from the laser light projecting and receiving part 121 is introduced, as reflected light, into the light receiving element 225 through the light receiving lens 224 of the laser light projecting and receiving part 121.

Here, a silicon PIN photodiode or an avalanche photodiode is used for the light receiving element 225 in the present embodiment. The light receiving element 225 photoelectrically converts reflected light to produce a laser light receiving signal and the light receiving signal amplification circuit 226 amplifies, and subsequently transmits to the laser signal processing part 122, a produced laser light receiving signal. The laser signal processing part 122 determines presence or absence of a road marking provided on a road, based on a laser light receiving signal transmitted from the laser light projecting and receiving part 121. Furthermore, a result of determination is transmitted to the image processing part 130.

<3. A Configuration of an Image Processing Part>

Next, a configuration of the image processing part 130 will be described. As described above, the image processing part 130 produces a parallax image. Here, a produced parallax image is used to, for example, calculate a distance of each object that is included in a taken image.

Then, a summary of a distance measuring technique (a stereo distance measuring technique) that calculated a distance of each object that is included in a taken image, based on a parallax image produced by the image processing part 130, will first and simply be described below, for explaining a configuration of the image processing part 130.

<3.1 A Summary of a Stereo Distance Measuring Technique>

In general, in a stereo distance measuring technique, a correlation (a similarity) of a pair of taken images that are transmitted from two monocular camera parts arranged left and right is obtained to sample an identical point and a parallax is calculated with respect to a sampled identical point to calculate a distance of such an identical point in accordance with a manner of triangulation.

Specifically, a part with a rendered identical object is sampled from a pair of taken images that are transmitted from two monocular camera parts. In a case where two monocular camera parts are placed left and right, positions of a rendered identical object in a pair of taken images are displaced left and right. Then, while one taken image is shifted from the other taken image pixel by pixel in left and right directions within a predetermined range (a parallax exploration range), positions of best overlapping (a similarity) are obtained so as to provide a corresponding identical point in such an identical object in a pair of taken images. Then, an amount of displacement between corresponding identical points (a parallax) is calculated and a distance of such an identical point is calculated from a relationship with a distance between optical axes of two monocular camera parts.

Here, it is possible to calculate a distance Z of an identical point in an identical object in accordance with the following formula:

$$Z = \frac{B \cdot f}{n \cdot d} \qquad \text{(Formula 1)}$$

wherein n is the number of pixels shifted herein, f is a focal length of a camera lens of a monocular cameral part, B is a length of a baseline (a distance between optical axes of monocular cameras), and d is a pitch of pixels. Here, a denominator (n×d) of formula 1 is a parallax.

<3.2 A Configuration of an Image Processing Part that Executes Parallax Calculation for Realizing a Stereo Distance Measuring Technique>

Figure 3:
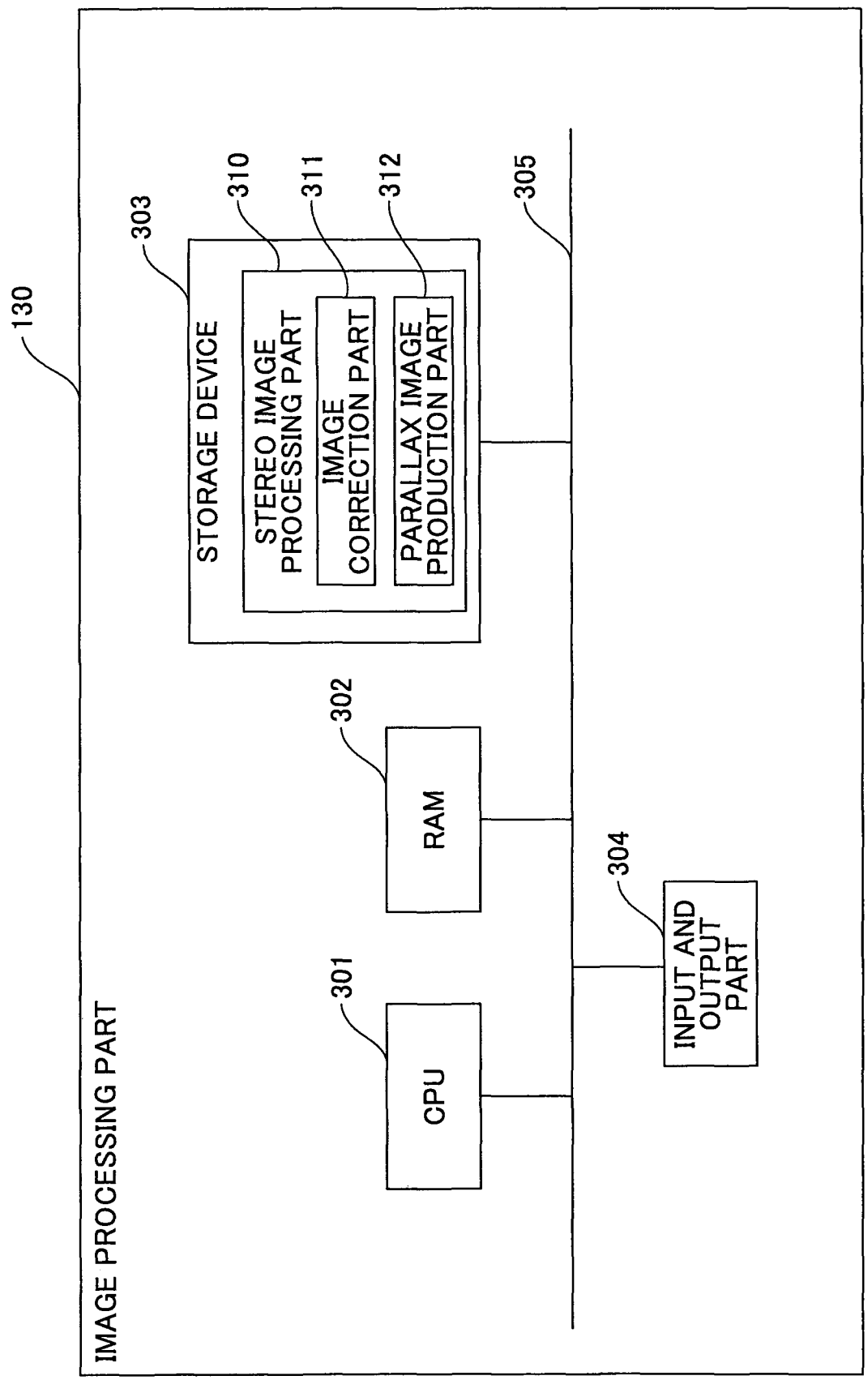
FIG. 3 is a diagram that illustrates a hardware configuration of an image processing part that composes a parallax calculation system.

Next, a configuration of the image processing part 130 will be described that executed parallax calculation for realizing a stereo distance measuring technique as described above. FIG. 3 is a diagram that illustrates a configuration of the image processing part 130 that executes parallax calculation for realizing a stereo distance measuring technique as described above.

As illustrated in FIG. 3, the image processing part 130 is provided with a Central Processing Unit (CPU) 301, an Random Access Memory (RAM) 302, a storage device 303, and an input and output part 304. Here, respective parts of the image processing part 130 are mutually connected through a bus 305.

The CPU 301 is a computer that executes a program stored in the storage device 303 (a program for functioning as a stereo image processing device 310). The CPU 301 executes such a program, and thereby, the image processing part 130 corrects a taken image transmitted from the stereo camera part 110 and executes parallax calculation based on a corrected taken image to produce a parallax image.

The RAM 302 is a main storage device such as a Dynamic Random Access Memory (DRAM) or a Static Random Access Memory (SRAM). The RAM 302 functions as a working area that is developed in a case where a program stored in the storage device 303 is executed by the CPU 301.

The storage device 303 is a memory such as an EPROM or an EEPROM and stores a program for functioning the CPU 301 as the stereo image processing part 310. The stereo image processing part 310 further has an image correction part 311 and a parallax image production part 312.

The image correction part 311 applies each kind of correction process such as a gamma correction or a distortion correction to a taken image transmitted from the sensor board 203 or 213.

The parallax image production part 312 provides corresponding identical points within a parallax exploration range in taken images corrected by the image correction part 311 to calculate a parallax. Then, a parallax is calculated for each pixel in a taken image to produce a parallax image. Here, the parallax image production part 312 changes a parallax exploration range for calculation of a parallax based on a result of determination output from the laser signal processing part 122.

The input and output part 304 is an interface part for communicating with the sensor board 203 or 213 or the laser signal processing part 122.

<4. A Configuration of a Laser Signal Processing Part>

Figure 4:
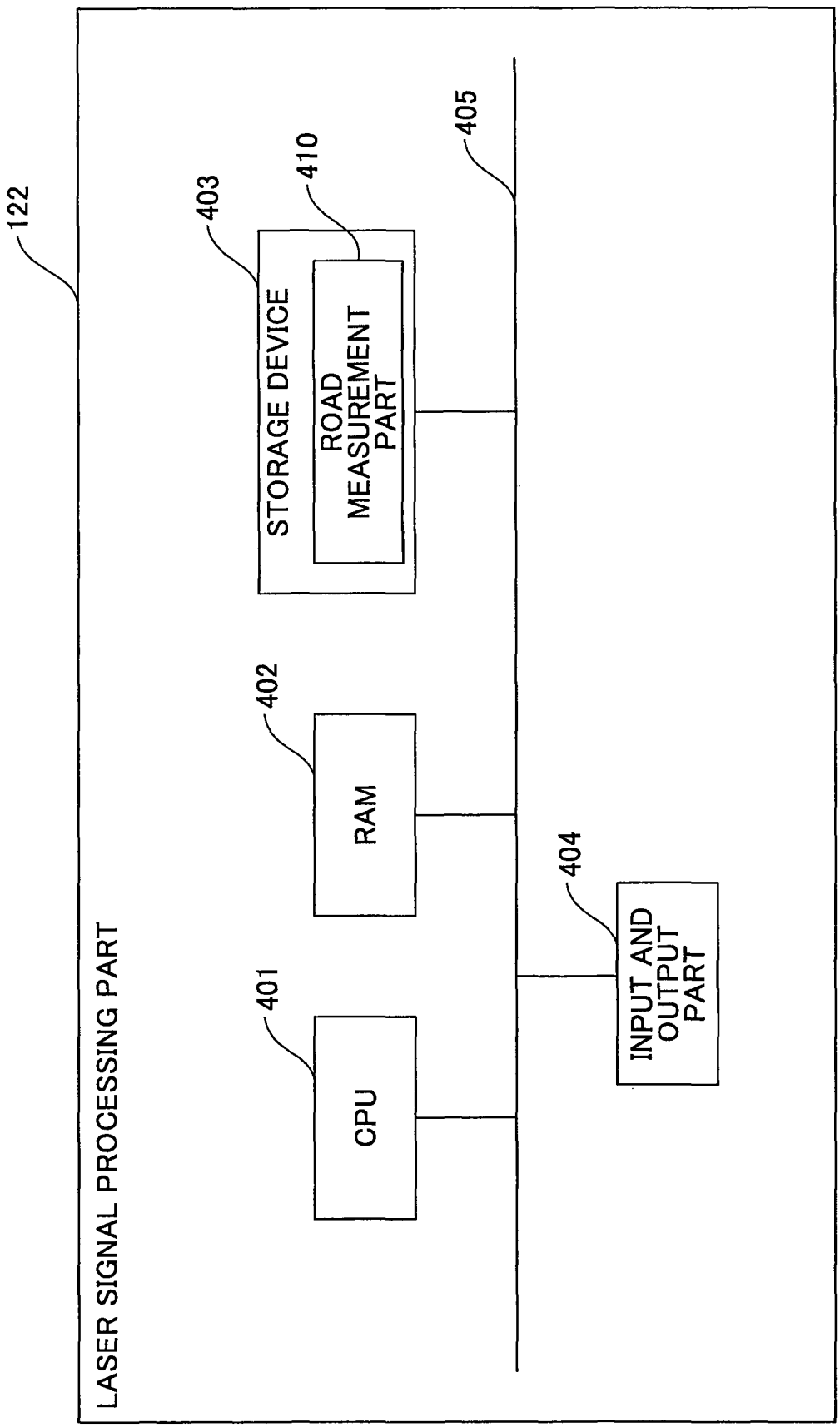
FIG. 4 is a diagram that illustrates a hardware configuration of a laser signal processing part that composes a parallax calculation system.

Next, a configuration of the laser signal processing part 122 will be described. FIG. 4 is a diagram that illustrates a configuration of the laser signal processing part 122.

As illustrated in FIG. 4, the laser signal processing part 122 is provided with a Central Processing Unit (CPU) 401, a Random Access Memory (RAM) 402, a storage device 403, and an input and output part 404. Here, respective parts of the image processing part 130 are mutually connected through a bus 405.

The CPU 401 is a computer that executes each program (a program for functioning as a road measurement part 410) stored in the storage device 403. The CPU 401 executes such a program, and thereby, the laser signal processing part 122 controls light projection or receiving of pulsed laser light by the laser light projecting and receiving part 121 and determines presence or absence of a road marking based on a laser light receiving signal produced in the laser light projecting and receiving part 121.

The RAM 402 is a main storage device such as a Dynamic Random Access Memory (DRAM) or a Static Random Access Memory (SRAM). The RAM 402 functions as a working area that is developed in a case where a program stored in the storage device 403 is executed by the CPU 401.

The storage device 403 is a memory such as an EPROM or an EEPROM and stores a program for causing the CPU 401 to function as the road measurement part 410.

The road measurement part 410 provides the light source driving circuit 221 with an instruction for emission of pulsed laser light and acquires a laser light receiving signal from the received-light signal amplification circuit 226. Furthermore, determination is provided with respect to presence or absence of a road marking at a position irradiated with laser light, based on an intensity of an acquired laser light receiving signal. Furthermore, a result of determination is transmitted to the image processing part 130.

The input and output part 404 is an interface part for communicating with the light source driving circuit 221, the received-light signal simplification circuit 226, and the image processing part 130.

<5. A Placement Method and a Setting Method for a Parallax Calculation System>

Next, a placement method for the parallax calculation system 100 and a setting method for the stereo camera part 110 and the laser light receiving part 121 that compose the parallax calculation system 100 will be described.

Figure 5:
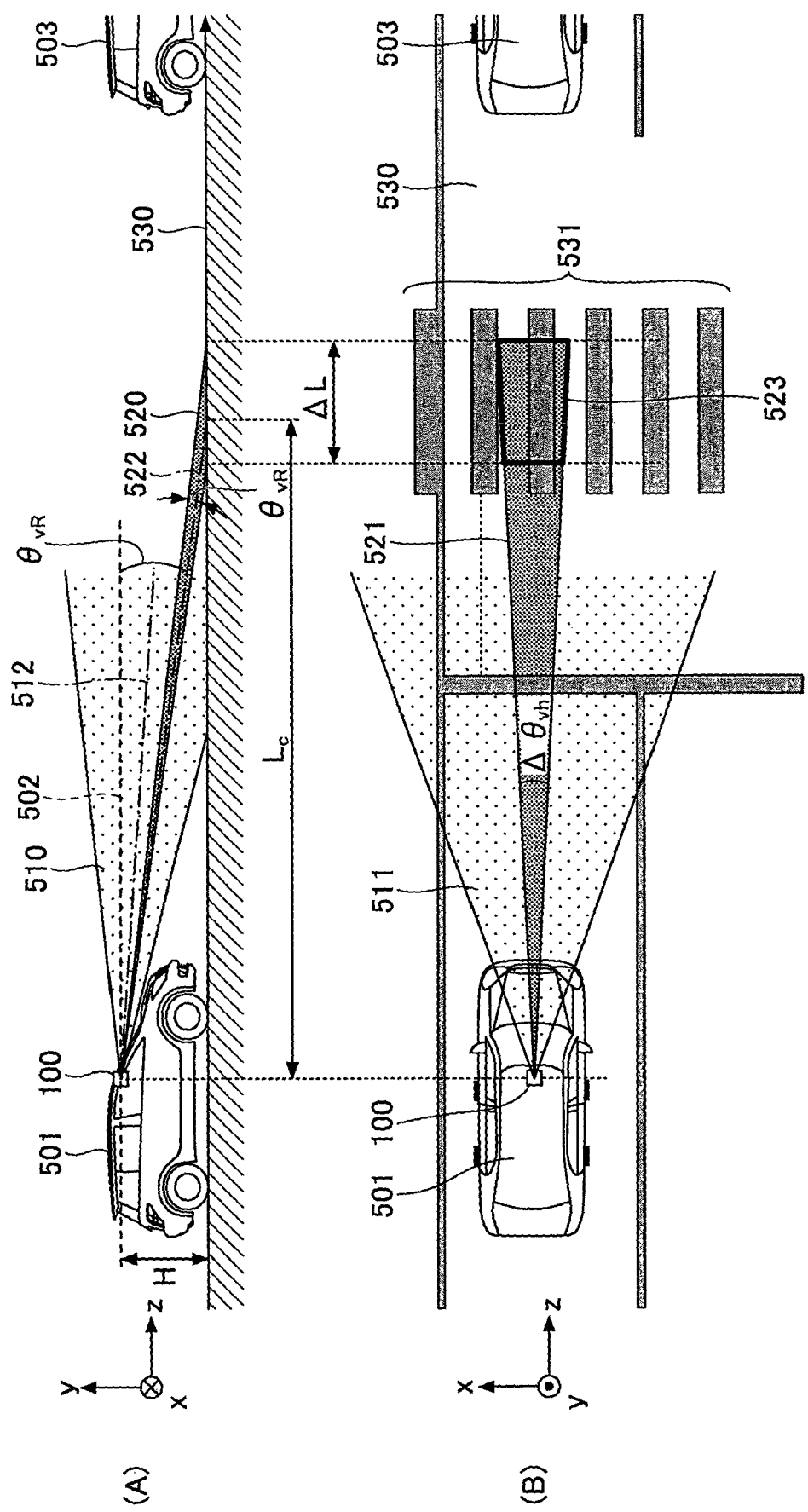
FIG. 5 is a diagram that illustrate a range image-taken by a stereo camera part that composes a parallax calculation system according to a first embodiment and a range of irradiation with laser light from a laser light projecting and receiving part.

FIG. 5 is a diagram for illustrating a placement method for the parallax calculation system 100 and a setting method for the stereo camera part 110 and the laser light projecting and receiving part 121. Among these, FIG. 5(A) illustrates a situation in such a manner that a vehicle 501 with the parallax calculation system 100 mounted thereon is viewed from a side with respect to a direction of movement thereof, and FIG. 5(B) illustrates a situation in such a manner that the vehicle 501 with the parallax calculation system 100 mounted thereon is viewed from a top with respect to a direction of movement thereof. A placement method for the parallax calculation system 100 and a setting method for the stereo camera part 110 and the laser light projecting and receiving part 121 will be described below, with reference to FIG. 5.

<5.1 a Placement Method for a Parallax Calculation System (a Position and a Direction)>

As illustrated in FIG. 5(A), the parallax calculation system 100 is placed on a ceiling part in the vehicle 501 near a windshield thereof (a position at a height H from a road 530). Furthermore, as illustrated in FIG. 5(B), placement is executed at an approximately central position with respect to a width of the vehicle 501.

Moreover, the parallax calculation system 100 is placed in such a manner that an image taking direction of each monocular camera part 111 or 112 of the stereo camera part 110 is a direction of forward movement of the vehicle 501.

Here, the laser light projecting and receiving part 121 is placed on the camera stay 230 in such a manner that a direction of emission of laser light is identical to an image taking direction of the monocular camera part 111 or 112, and hence, such a direction of emission of laser light is also a direction of forward movement of the vehicle 501.

<5.2 A Setting Method for a Stereo Camera Part and a Laser Light Projecting and Receiving Part (an Elevation Angle and Revolution Angle)>

Next, a setting method for the stereo camera part 110 and the laser light projecting and receiving part 121 that compose the parallax calculation system 100 (an elevation angle and revolution angle) will be described.

As illustrated in FIG. 5(A), an elevation angle of an image taking direction of the stereo camera part 110 (an angle around an x-axis) is set in such a manner that an image taking range 510 includes a straight line 502 that passes through a position of placement of the stereo camera part 110 and being parallel to a road 530 and includes the road 530. Here, in an example of FIG. 5(A), setting is further provided in such a manner that a center line 512 of the image taking range 510 (an optical axis of the monocular camera part 111 or 112) is positioned under the straight line 502.

Furthermore, an elevation angle of a direction of emission of laser light from the laser light projecting and receiving part 121 (an angle around an x-axis) is set in such a manner that a laser light irradiation range 520 is included in an image taking range 510 of the stereo camera part 110 and provided at an angle $\theta_{vR}$ in a downward direction with respect to the straight line 502. Here, $\theta_{vR}$ is greater than zero and a value greater than an angle of an optical axis of the monocular camera part 111 or 112 with respect to the straight line 502. That is, a light axis of laser light is directed more downward than an optical axis of the monocular camera part 111 or 112.

Furthermore, as illustrated in FIG. 5(B), a revolution angle in an image taking direction of the stereo camera part 110 (an angle around a y-axis) is set in such a manner that the image taking range 511 is symmetric with respect to a (non-illustrated) longitudinal axis that passes through a center of the vehicle 501 in a direction of a width thereof. Specifically, setting is provided in such a manner that a longitudinal axis that passes through a center of the vehicle 501 in a direction of a width thereof is parallel to an optical axis of the monocular camera part 111 or 112.

Furthermore, a revolution angle (an angle around a y-axis) in a direction of emission of laser light from the laser light projecting and receiving part 121 is set in such a manner that a laser light irradiation range 521 is included in the image taking range 510 of the stereo camera part 110. Here, although a revolution angle of a direction of emission of laser light from the laser light projecting and receiving part 121 in an example of FIG. 5(B) is set in such a manner that an optical axis of the monocular camera part 111 or 112 is parallel to a (non-illustrated) center line of the laser light irradiation range 521, the present invention is not limited thereto.

<5.3 A Image Taking Range of a Stereo Camera Part and a Laser Light Irradiation Range of a Laser Light Projecting and Receiving Part>

An angle of view of the image taking range of the stereo camera part 110 in the present embodiment is set at approximately 15 [degrees]-20 [degrees] in a vertical direction (a direction of a y-axis) as illustrated in FIG. 5(A). Furthermore, setting is executed to provide approximately 40 [degrees]-60 [degrees] in a horizontal direction (a direction of an x-axis) as illustrated in FIG. 5(B).

Furthermore, a spread angle of the laser light irradiation range 520 of the laser light projecting and receiving part 121 is set to be less than the image taking ranges 510 and 511 of the stereo camera part 110 in both a vertical direction (a direction of a y-axis) and a horizontal direction (a direction of an x-axis) as illustrated in FIG. 5.

Here, in a case where a road marking (a crosswalk 531) that is present at a position of $L_c$ [m] in a direction of forward movement of the vehicle 501 is detected as illustrated in FIG. 5(A), the following formula:

$$\theta_{vR} = \tan^{-1}\left(\frac{H}{L_c}\right) [\text{rad}] \quad \text{(Formula 2)}$$

is held.

Furthermore, it is possible to obtain a spread angle $\Delta\theta_{vR}$ of the laser light irradiation range 520 in a vertical direction (a direction of a y-axis) in accordance with the following formula:

$$\Delta\theta_{vR} \approx \frac{H \cdot \Delta L}{L_c^2} [\text{rad}] \quad \text{(Formula 3)}$$

wherein $\Delta L$ is a length of a laser light irradiation range 523 in a direction of a depth (a direction of a z-axis) on the road 530 at a front side.

Accordingly, for example, as $\Delta L$=2 [m] (a length in a direction of a depth (a direction of a z-axis) that is suitable for detection of a road marking) is provided at H=1.4 [m] and $L_c$=10 [m], $\Delta\theta_{vR}$=0.028 [rad] (1.6 [degrees]) is provided at $\theta_{vR}$=0.14 [rad] (8 [degrees]).

On the other hand, a spread angle $\Delta\theta_{hR}$ of the laser light irradiation range 521 in a horizontal direction (a direction of an x-axis) for the laser light projecting and receiving part 121 is preferably set in such a manner that a length of the irradiation range 523 on a road in a horizontal direction (a direction of an x-axis) is a suitable length dependent on a road marking. That is because it is possible to determine presence or absence of a road marking with a repetitive pattern (the crosswalk 531) reliably even in a case where a center of an irradiation range is slightly changed in a horizontal direction (a direction of an x-axis).

For example, the crosswalk 531 is such that white lines and asphalt surfaces that have widths of approximately 0.5 m are aligned at equal intervals and a reference pitch of a repetitive pattern is approximately 1 m. Therefore, a length of the laser light irradiation range 523 on a road in a horizontal direction is preferably approximately 1 [m] in order to detect a crosswalk that is present at a position of 10 m in a direction of forward movement reliably. That is, a spread angle $\Delta\theta_{hR}$ of the laser light irradiation range 521 in a horizontal direction (a direction of an x-axis) is preferably set at, for example, approximately 6 [degrees].

<5.4 A Relation to a Taken Image>

As described above, an elevation angle of a direction of emission of laser light from the laser light projecting and receiving part 121 has been described such that:

the laser light irradiation range 520 is included within a range of the image taking range 510 of the stereo camera part 110; and the center line 522 of the laser light irradiation range 520 is directed downward by an angle of $\Delta\theta_{vR}$ (wherein $\Delta\theta_{vR}$>0) with respect to a straight line 502 that passes through the parallax calculation system 100 and is parallel to the road 530.

Furthermore, a revolution angle of a direction of emission of laser light from the laser light projecting and receiving part 121 has been described such that:

the laser light irradiation range 521 is included within a range of the image taking range 511 of the stereo camera part 110.

However, a setting method for an elevation angle and a revolution angle of a direction of emission of laser light from the laser light projecting and receiving part 121 are not limited as described above and may further be limited based on a relation to a taken image that is taken in the stereo camera part 110.

Figure 6:
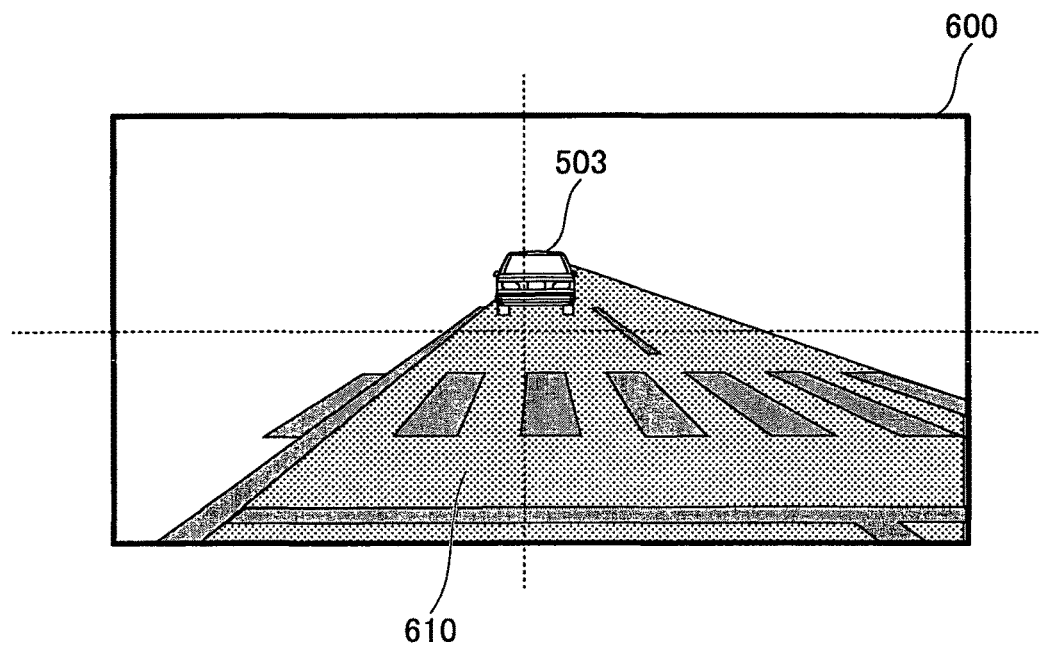
FIG. 6 is a diagram that illustrates a range of irradiation with laser light (a range of irradiation on a road image) in a taken image that is taken by a stereo camera part.

FIG. 6 is a diagram for illustrating a setting method that further limits an elevation angle and a revolution angle of a direction of emission of laser light from the laser light projecting and receiving part 121. In a case where the stereo camera part 110 is set by a setting method as described above, a road image 610 (a shaded portion) is rendered in a taken image 600 as illustrated in the taken image 600 in FIG. 6.

Herein, it is sufficient for the laser radar distance measuring part 120 according to the present embodiment to detect a road marking that is a factor of occurrence of an error in parallax calculation based on a taken image that is taken by the stereo camera part 110. Therefore, it is sufficient for an elevation angle and a revolution angle of a direction of emission of laser light to be set in such a manner that one position in an area rendered as the road image 610 in a taken image on the road 530 in a direction of forward movement of the vehicle 501 is within an irradiation range on such a road (or is an object to be irradiated).

Figure 7:
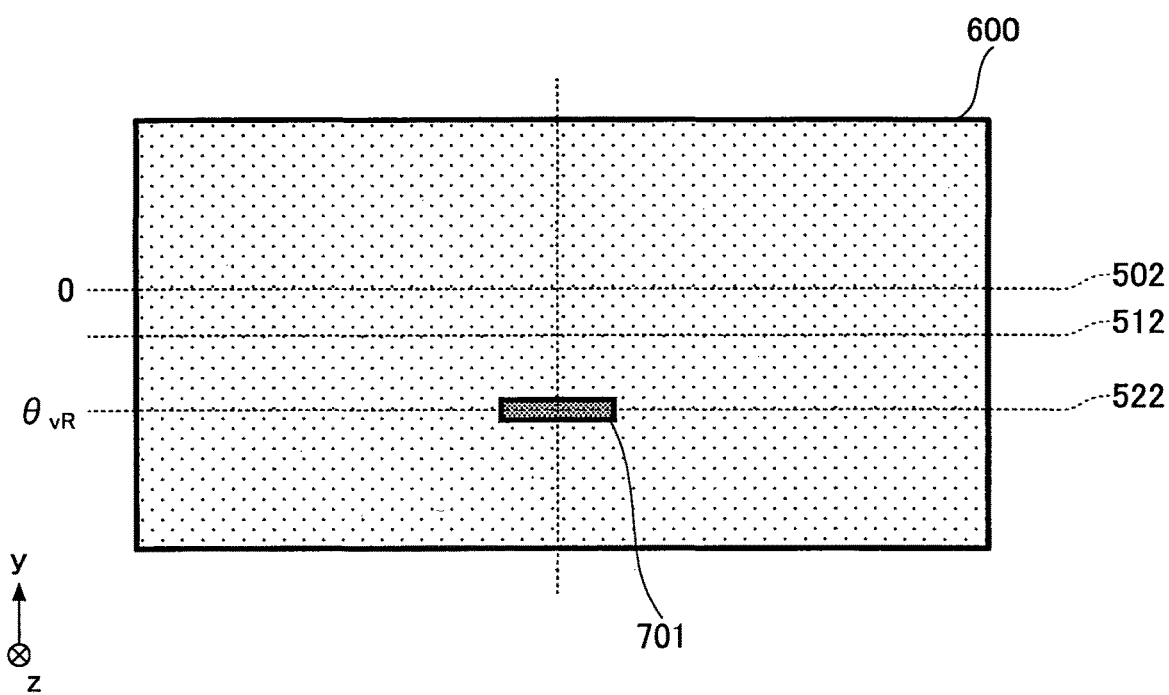
FIG. 7 is a diagram that illustrates a range of irradiation with laser light (a range of irradiation on a road image) in a taken image that is taken by a stereo camera part.

FIG. 7 is a diagram that illustrates the irradiation range 523 on a road in a case where laser light is emitted from the laser light projecting and receiving part 121 with thus set elevation angle and revolution angle, as a irradiation range image 701 in the taken image 600.

As one position in an area rendered as the road image 610 in the taken image 600 is provided within an irradiation range on a road, the irradiation range image 701 in an example of FIG. 7 is arranged under the center line 512 of the image taking range 510 (at a position that corresponds to an elevation angle $\theta_{vR}$). In other words, as an irradiation range is provided under an optical axis of the monocular camera part 111 or 112, the irradiation range image 701 is arranged at a position with a rendered road. Furthermore, arrangement is executed on a center line of the image taking range 511. Here, a size of a rendered irradiation range image 701 is a size that is dependent on a spread angle $\Delta\theta_{vR}$ of the laser light irradiation range 520 in a vertical direction and a spread angle $\Delta\theta_{hR}$ of the irradiation range 521 in a horizontal direction.

<6. A Flow of a Process in a Parallax Calculation System>

Figure 8:
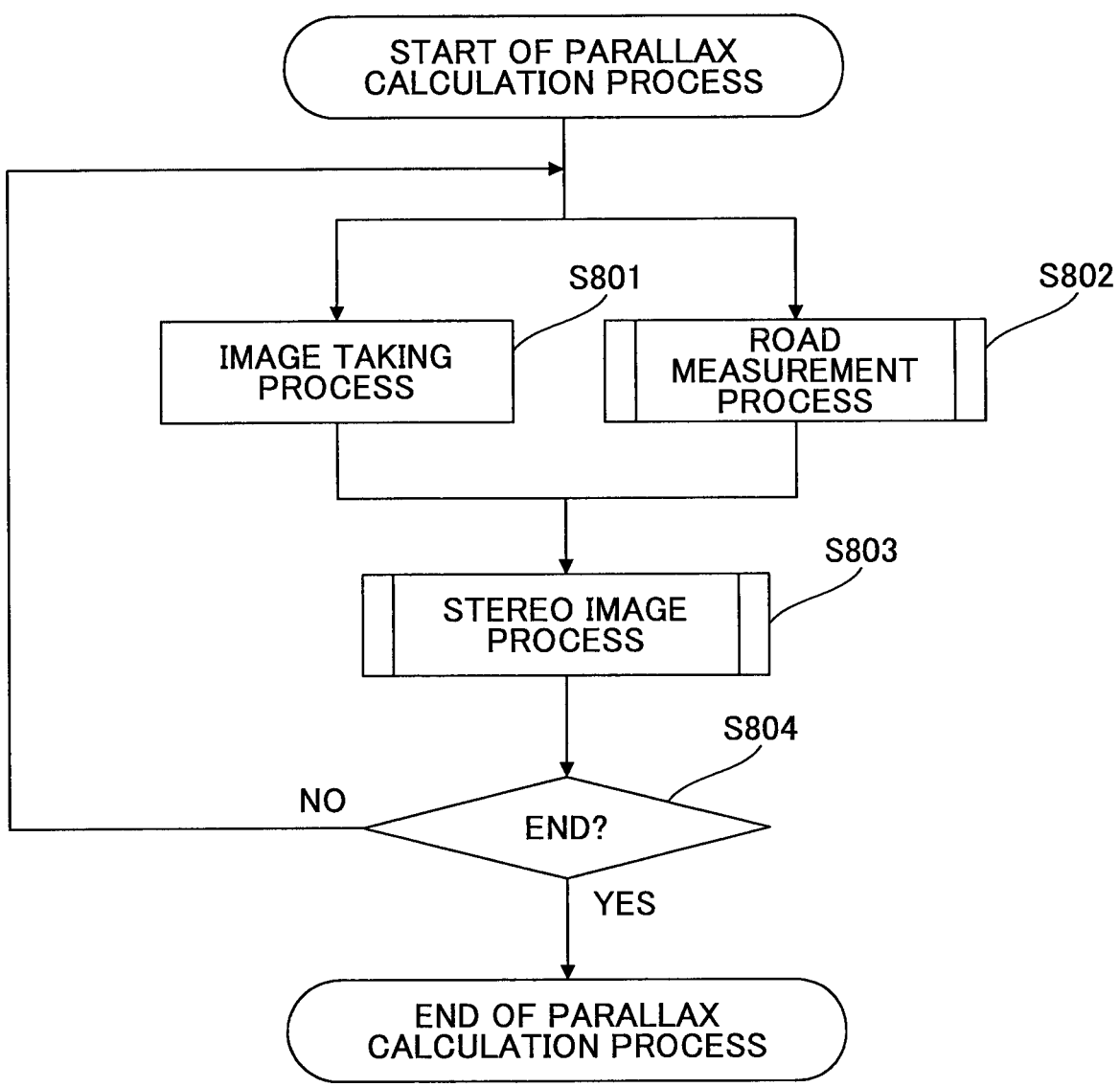
FIG. 8 is a flowchart that illustrates a flow of a parallax calculation process in a parallel calculation system.

Next, a flow of a parallax calculation process in the parallax calculation system 100 will be described. FIG. 8 is a flowchart that illustrates a flow of a parallax calculation process in the parallax calculation system 100.

As the parallax calculation system 100 starts a parallax calculation process, an image taking process wherein the monocular camera parts 111 and 112 mutually synchronize to execute image taking is executed based on an instruction from the image processing part 130 at step S801.

Moreover, the laser radar distance measuring part 120 executes a road measurement process at step S802. Specifically, the laser light projecting and receiving part 121 first executes light projection or receiving of pulsed laser light based on an instruction from the laser signal processing part 122 (the road measurement part 410 of the laser signal processing part 122, wherein the same applies to the following). Moreover, the laser signal processing part 122 determines presence or absence of a road marking based on a laser light receiving signal that is produced in the laser light projecting and receiving part 121 due to light projection or receiving of laser light, and transmits a result of determination to the image processing part 130.

Here, an image taking process at step S801 and a road measurement process at step S802 are executed in parallel. That is, while the monocular camera parts 111 and 112 executes image taking of a taken image in one frame, the laser light projecting and receiving part 121 executes one pulse light projection or receiving of pulsed laser light.

At step S803, the image processing part 130 executes a parallax calculation process based on a taken image in one frame and executes a stereo image process that produces a parallax image. Herein, in a case where a result of determination that a road marking is present is transmitted to the image processing part 130 in a road measurement process executed to correspond to an image taking process in such a frame, a parallax exploration range is changed based on such a result of determination.

At step S804, determination is executed as to whether or not an instruction for an end of a parallax calculation process is input, and if no input is determined, returning to step S801 and step S802 is executed. Then, an image taking process is executed for a next frame and next light projection or receiving of pulsed laser light is executed so that a road measurement process is executed.

Afterward, until an instruction for an end of a parallax calculation process is input, an image taking process is executed in a frame unit and a road measurement process is executed for one pulse in each frame, while a stereo image process is executed in frame unit.

On the other hand, at step S804, a process is ended in a case where determination is provided such that an instruction for an end of a parallax calculation process is input.

<7. A Flow of a Road Measurement Process>

Figure 9:
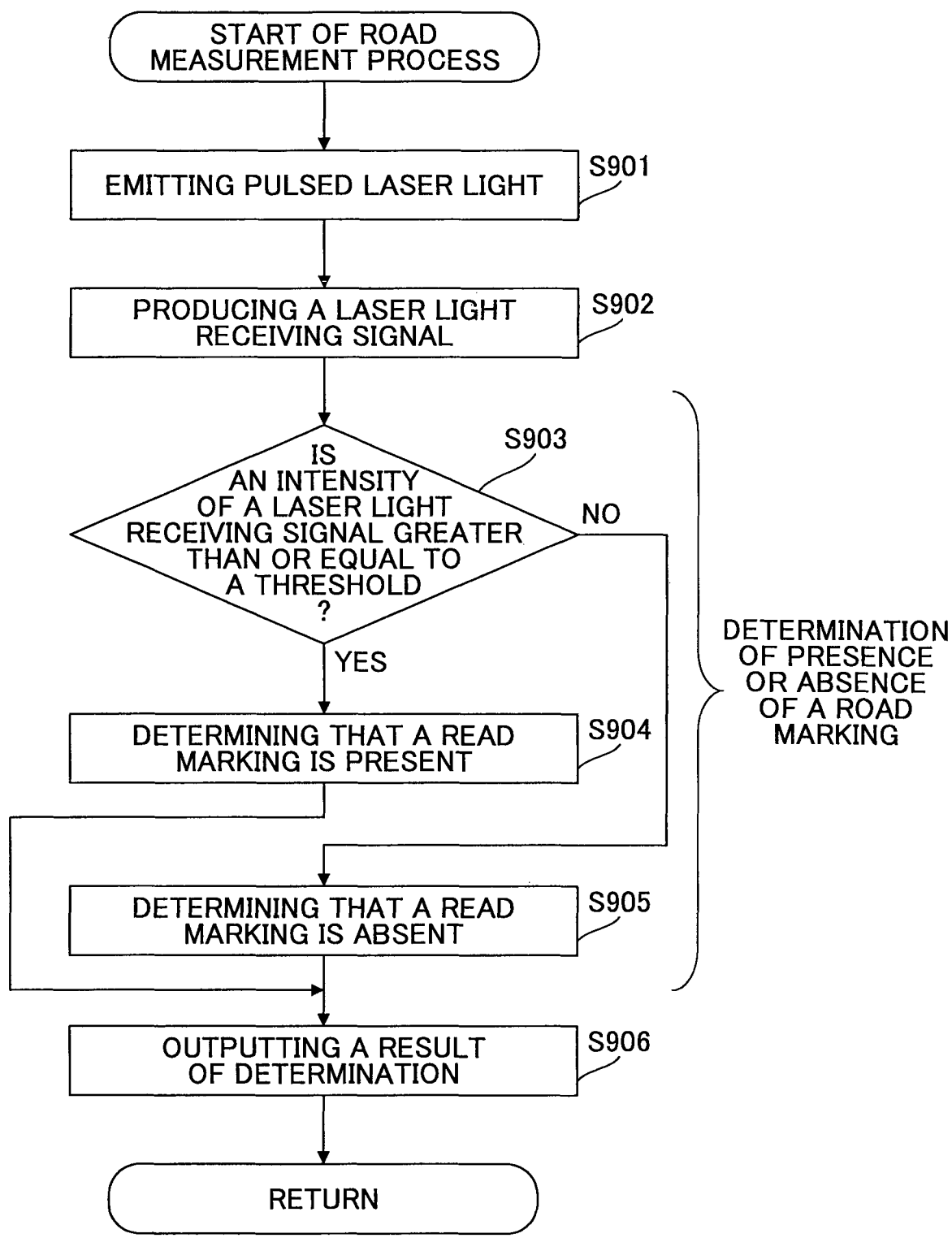
FIG. 9 is a flowchart that illustrates a flow of a road measurement process in a laser radar distance measuring part.

Next, a detailed flow of a road measurement process (step S802) in the laser radar distance measuring part 120 will be described with reference to FIG. 9, FIG. 10A, and FIG. 10B. FIG. 9 is a flowchart that illustrates a detailed flow of a road measurement process (step S802) in the laser radar distance measuring part 120. Furthermore, FIG. 10A and FIG. 10B are diagrams that illustrate each signal to be processed in the laser radar distance measuring part 120 at a time of a road measurement process. Among these, FIG. 10A illustrates each signal in a case where a road measurement process is executed on a condition that a road marking is present in the irradiation range 523 on a road to be irradiated with laser light. Furthermore, FIG. 10B illustrates each signal in a case where a road measurement process is executed on a condition that a road marking is absent in the irradiation range 523 on a road to be irradiated with laser light.

A flow of a road measurement process will be described below, in accordance with a flowchart in FIG. 9 with reference to FIG. 10A and FIG. 10B.

At step S901, the laser light projecting and receiving part 121 produces a light source light emission signal (a light source light emission signal 1002 in FIG. 10A and FIG. 10B) based on an instruction for the laser signal processing part 122 (a trigger signal 1001 illustrated in FIG. 10A and FIG. 10B). Thereby, the laser light projecting and receiving part 121 emits pulsed laser light.

At step S902, the laser light projecting and receiving part 121 receives reflected light from a road and produces a laser light receiving signal, after a predetermined period of time has passed since pulsed laser light is emitted. Then, a produced laser light receiving signal is output to the laser signal processing part 122.

A laser light receiving signal 1003 in FIG. 10A is a signal produced based on reflected light in a case where a road marking is present in an irradiation range on a road irradiated with laser light. On the other hand, a laser light receiving signal 1013 in FIG. 10B is a signal produced based on reflected light in a case where a road marking is absent on an irradiation range on a road irradiated with laser light.

As is clear from composition between the laser light receiving signal 1003 and the laser light receiving signal 1013, an intensity of a laser light receiving signal is different depending on presence or absence of a road marking. Specifically, an intensity of the laser light receiving signal 1003 in a case where a road marking is present is higher than that of the laser light receiving signal 1013 in a case where a road marking is absent.

At steps S903 to S905, the laser signal processing part 122 executes a process for determining presence or absence of a road marking. First, step S903, the laser signal processing part 122 determines whether or not a laser light receiving signal produced at step S902 is greater than or equal to a predetermined threshold. Specifically, the laser light receiving signal 1003 or 1013 is input into a comparator with a set predetermined threshold.

At step S903, in a case where determination is executed so as to be greater than or equal to a predetermined threshold (a comparator threshold) (a case where a light receiving time signal 1004 is output by executing an input to a comparator), going to step S904 is executed. At step S904, the laser signal processing part 122 determines that a road marking is present in a laser light irradiation range of a road.

On the other hand, at step S903, in a case where determination is executed so as to be less than a predetermined threshold (a comparator threshold) (a case where a light receiving time signal is not output by executing an input into a comparator (see the light receiving time signal 1014 in FIG. 10B)), going to step S905 is executed. At step S905, the laser signal processing part 122 determines that a road marking is not present in a laser light irradiation range on a road.

At step S906, the laser signal processing part 122 outputs a result of determination (the light receiving time signal 1004 or 1014) to the image processing part 130.

<8. A Stereo Image Process in an Image Processing Part>

Figure 11:
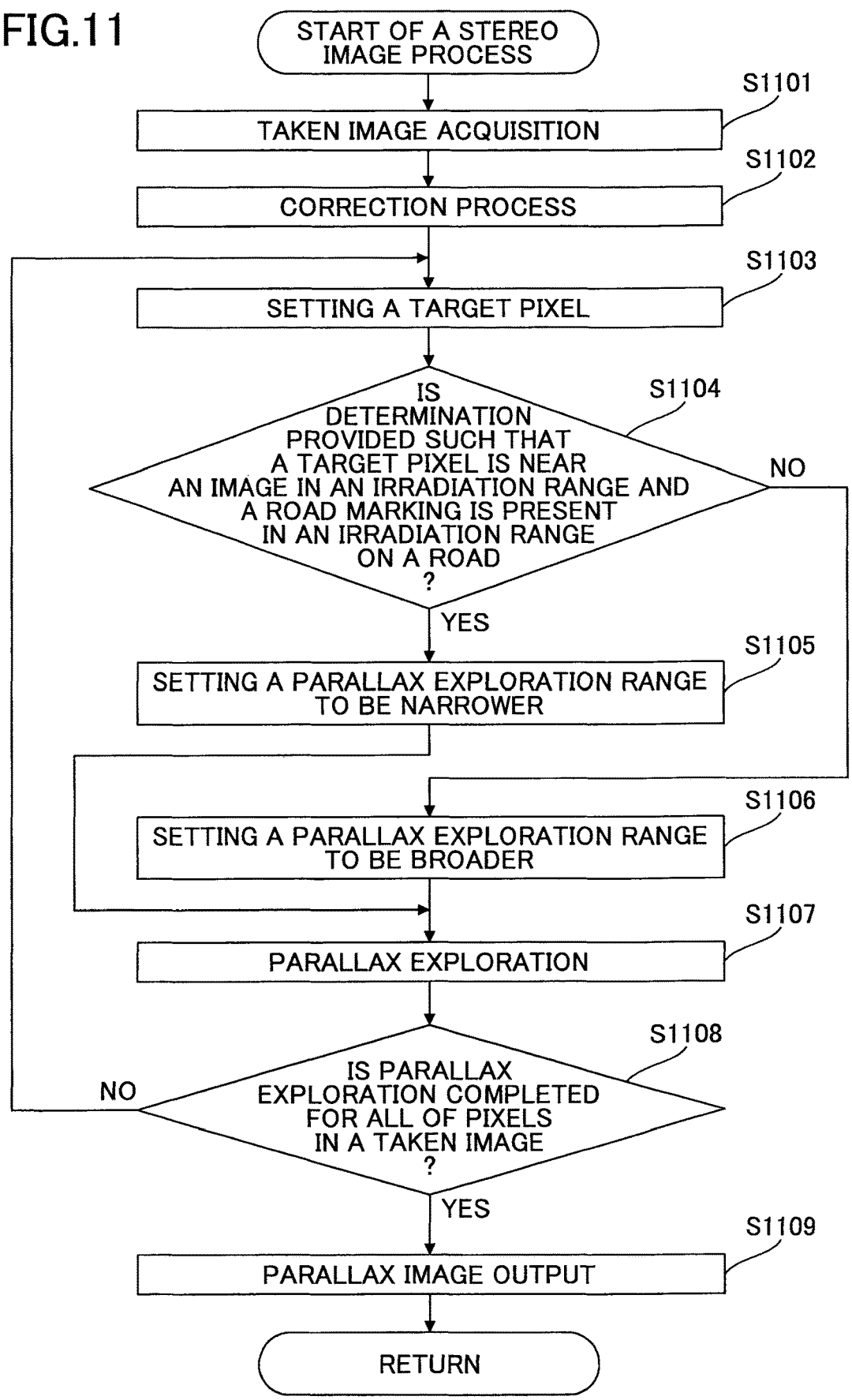
FIG. 11 is a diagram that illustrates a content of a stereo image process in an image processing part that composes a parallax calculation system according to a first embodiment.
Figure 12A:
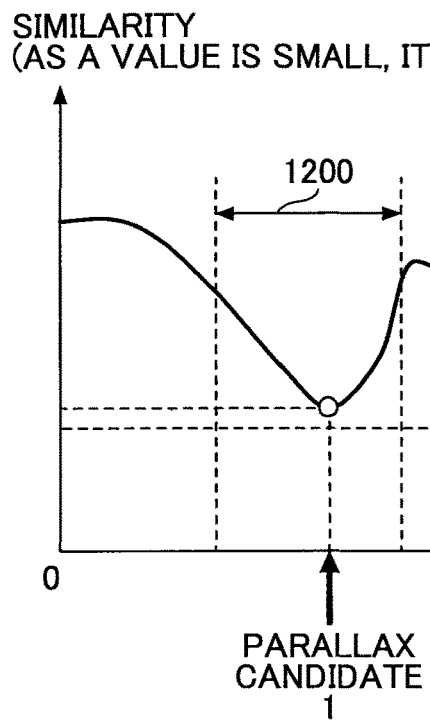
FIG. 12A and FIG. 12B are diagrams that illustrate a parallax exploration range set in a stereo image process.
Figure 12B:
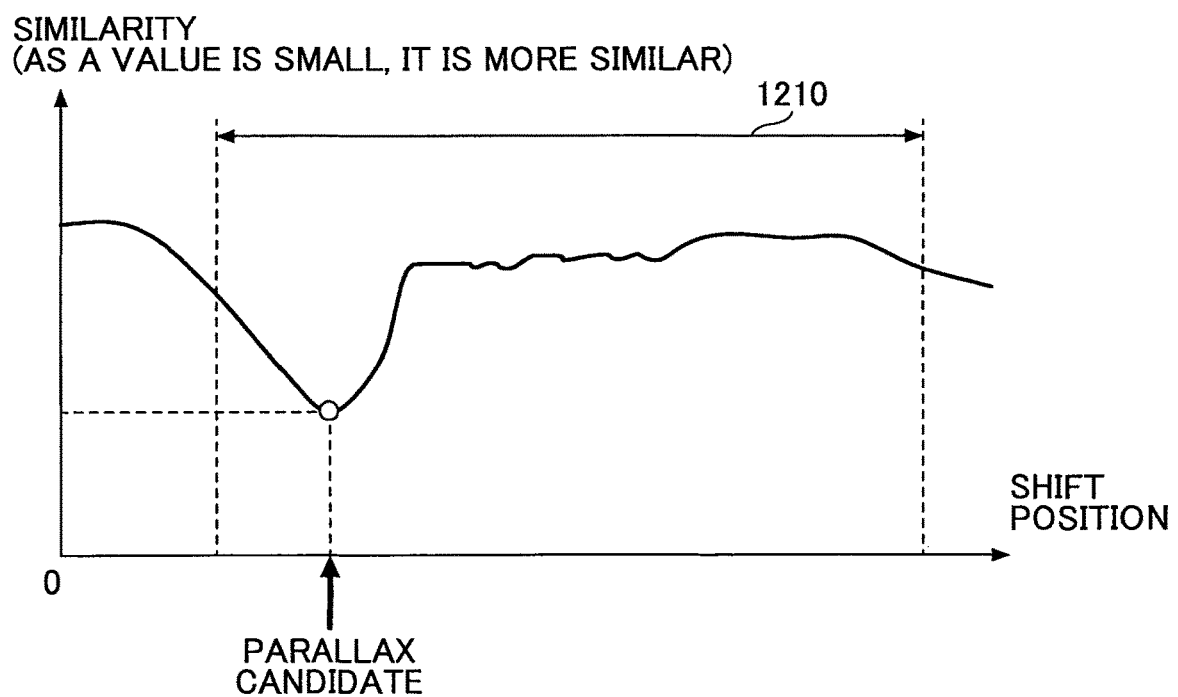

Next, a detailed flow of an stereo image process (step S803) in the image processing part 130 will described with reference to FIG. 11, FIG. 12A, and FIG. 12B. FIG. 11 is a flowchart that illustrates a detailed flow of a stereo image process (step S803) in the image processing part 130. Furthermore, FIG. 12A and FIG. 12B are diagrams that illustrate one example of a change of a similarity calculated at each shift position while one taken image (a reference image) in a pair of taken images is shifted with respect to the other taken image (a standard image) pixel by pixel in order to calculate parallax for a predetermined pixel. Here, longitudinal axes indicated in FIG. 12A and FIG. 12B are normalized so as to provide a smaller value as a similarity is increased and to provide a larger value as a similarity is decreased.

At step S1101 in FIG. 11, the image correction part 311 acquires a taken image for one frame from each of the monocular camera parts 111 and 112.

At step S1102, the image correction part 311 executes a correction process such as a gamma correction or a distortion correction for taken images (a pair of taken images) in one frame that are acquired at step S1101.

At step S1103, the parallax image production part 312 sets a target pixel that is a target to be subjected to parallax calculation among pixels that are included in a reference image.

At step S1104, the parallax image production part 312 determines whether or not a subject pixel is a pixel near a pixel that corresponds to a laser light irradiation range on a road within a reference image (a pixel that composes the irradiation range image 701). Moreover, the parallax image production part 312 determines whether or not determination is provided in such a manner that a road marking is present in such a laser light irradiation range on a road, based on a result of determination (a light receiving time signal) output from the laser signal processing part 122.

Specifically, coordinates of each pixel that composes the irradiation range image 701 within a reference image are known, and hence, determination is provided at step S1104 as to whether or not a target pixel set at step S1103 based on such coordinates is a pixel near such a known pixel.

Furthermore, determination is provided as to whether or not the light receiving time signal 1004 is transmitted from the laser signal processing part 122 or the light receiving time signal 1014 is transmitted therefrom, as a taken image acquired at step S1101 is taken.

In a case where determination is provided in such a manner that a target pixel is a pixel near an irradiation range image within a reference image and determination is provided in such a manner that a road marking is present in such a laser light irradiation range on a road, going to step S1105 is executed.

At step S1105, the parallax image production part 312 sets a narrow parallax exploration range. A parallax exploration range 1200 in FIG. 12A illustrates one example of a parallax exploration range set at step S1105.

Thus, in a case where a road marking is present, a plurality of local minimum points are present (a plurality of parallax candidates are present), and hence, there has conventionally been a possibility of sampling of a parallax candidate (a parallax candidate 2 in FIG. 12A) different from a parallax candidate to be sampled (a parallax candidate 1 in FIG. 12A). On the other hand, in a case where determination is provided in such a manner that a road marking is present, a narrow parallax exploration range is set in the present embodiment. As a result, it is possible to avoid sampling of a parallax candidate (a parallax candidate 2 in FIG. 12A) different from a parallax candidate to be sampled (a parallax candidate 1 in FIG. 12A).

Here, at step S1104, in a case where determination is provided in such a manner that a target pixel is not a pixel near the irradiation range image 701 within a reference image or a case where determination is provided in such a manner that a road marking is not present in such a laser light irradiation range on a road, going to step S1106 is executed.

At step S1106, the image processing part 130 sets a default parallax exploration range 1210 (a parallax exploration range that is broader than the parallax exploration range 1200 set at step S1105) is set.

A plurality of local minimum points are also not generated (a plurality of parallax candidates are also not present) at positions where a road marking is not present. Hence, it is possible to sample only one parallax candidate to be sampled even in a case where the default parallax exploration range 1210 is set as illustrated in FIG. 12B.

At step S1107, a parallax exploration is executed in a parallax exploration range set at step S1105 or step S1106 and a sampled parallax candidate is provided as a parallax.

At step S1108, determination is provided as to whether or not a parallax exploration has been executed for all of pixels in a taken image in one frame that is acquired at step S1101. In a case where a determination is provided at step S1108 in such a manner that there is a pixel where a parallax exploration is not executed, returning to step S1103 and setting of a next pixel as a target pixel are executed and processes at step 1104 to step S1107 are executed.

On the other hand, in a case where a determination is provided at step S1108 in such a manner that a parallax exploration has been executed for all of pixels, going to step S1109 is executed so that a parallax image for such a taken image is output.

<9. A Summary>

As is clear from the above descriptions, the parallax calculation system 100 according to the present embodiment is:

configured in such a manner that a laser radar distance measuring part is arranged to set a light axis of laser light emitted from a laser radar distance measuring part to be under an optical axis of a monocular camera part.

Thereby, it is possible to detect a road marking that is a case of occurrence of an error in parallax calculation.

Furthermore, the parallax calculation system 100 according to the present embodiment is:

configured in such a manner that a determination is provided as to whether or not a road marking is present, from an intensity of a laser light receiving signal produced based on reflected light of laser light that irradiates a road; and configured in such a manner that a parallax exploration range in a case where a determination is provided in such a manner that a road marking is present is set to be narrower than a parallax exploration range to be used in a case where a determination is not provided in such a manner that a road marking is present, for parallax calculation based on a taken image that is taken by a stereo camera part.

Thereby, it is possible to avoid a situation that a parallax candidate not to be sampled is sampled in a parallax exploration, even in a case where a road marking that is a repetitive pattern on a road is included in a taken image to be used for parallax calculation.

That is, it is possible to reduce a frequency of occurrence of an error in a case where parallax calculation is executed by using a taken image that is taken by using a plurality of monocular camera parts.

A Second Embodiment

Although the first embodiment described above is configured in such a manner that one pulse of pulsed laser light is emitted during image taking of a taken image in one frame, the present invention is not limited thereto. For example, a configuration may be such that a plurality of pulses of pulsed laser light are emitted during image taking of a taken image in one frame.

As a configuration is provided so as to emit a plurality of pulses of pulsed laser light, it is possible to provide a plurality of irradiation ranges within a taken image in one frame, for example, at different positions (a position close to and a position far from an own vehicle) in a depth direction (a direction of a z-axis). That is, it is possible to increase a frequency of changing of a parallax exploration range.

Here, for a configuration for emitting a plurality of pulsed of pulsed laser light during image taking of a taken image in one frame, for example, it is possible to consider configurations as follows.

A plurality of laser light projecting and receiving parts are installed in a parallax calculation system.

A laser light scanning device such as a polygon mirror or a MEMS mirror is arranged in a laser light projecting and receiving part wherein scanning is executed in directions of forward and backward movement of a vehicle during image taking of a taken image in one frame and pulsed laser light is emitted at each scanning position.

A beam splitter and a plurality of adjustment lenses adjusted to provide different directions of emission of laser light are disposed in a laser light projecting and receiving part. Then, a generally collimated beam is produced by a light projection lens 223, subsequently the beam is split by a beam splitter, and pulsed laser light is emitted via each adjustment lens.

Here, in accordance with a configuration to emit a plurality of pulses of pulsed laser light, a plurality of light receiving elements are disposed in the laser light projecting and receiving part 121.

Figure 13:
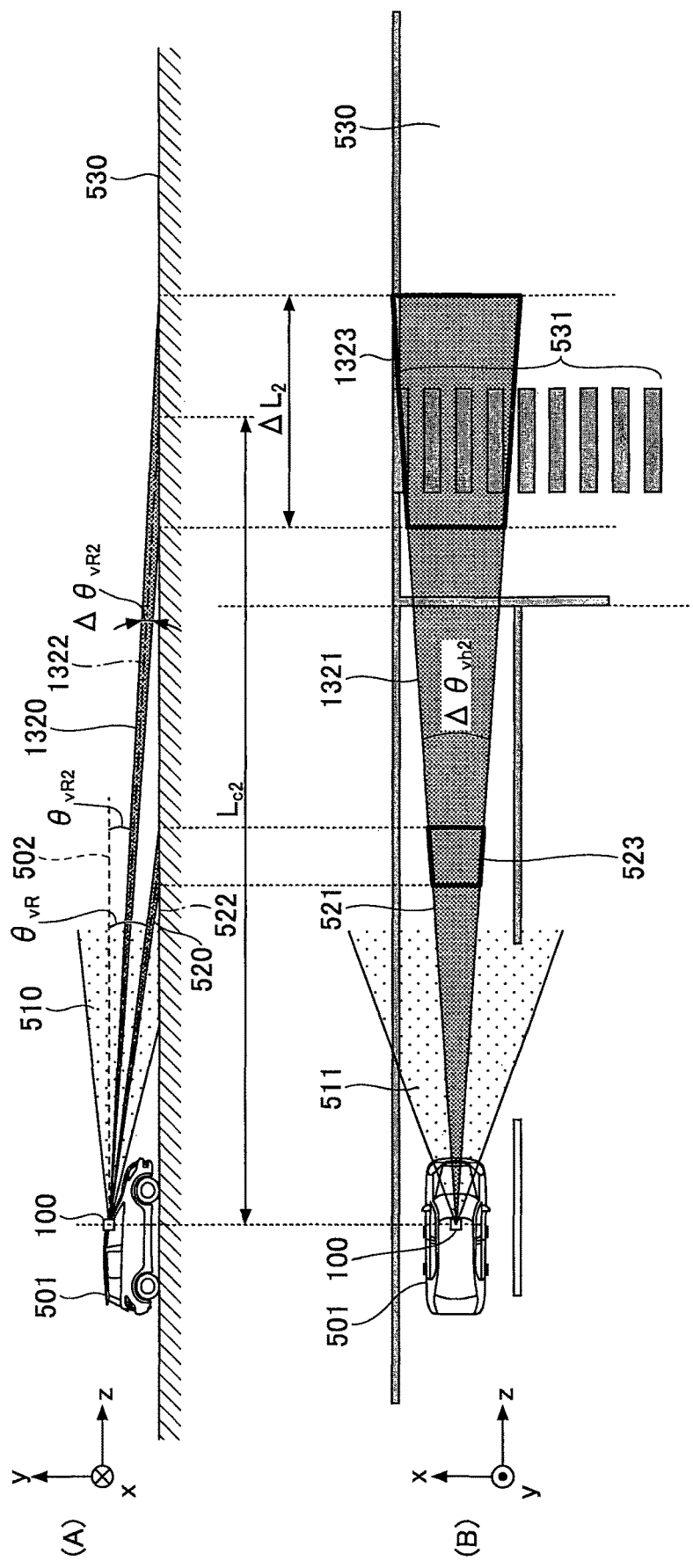
FIG. 13 is a diagram that illustrates a range image-taken by a stereo camera part that composes a parallax calculation system according to a second embodiment and a range of irradiation with laser light from a laser light projecting and receiving part.

FIG. 13 is a diagram that illustrates a method for setting the parallax calculation system 100 in a case where a configuration is provided in such a manner that each of two irradiation ranges on a road is irradiated with pulsed laser light (first laser light and second laser light) during image taking of a taken image in one frame. Here, an elevation angle, a revolution angle, and spread angles of irradiation ranges in a vertical direction and a horizontal direction, of a direction of emission of first laser light, as illustrated in FIG. 13 are identical to those of laser light as illustrated in FIG. 5, and hence, will be provided with identical reference numerals or letters to omit a description(s) thereof herein. Furthermore, spread angles of irradiation ranges of second laser light in a vertical direction and a horizontal direction and a revolution angle of a direction of emission of the second laser light are identical to spread angles of irradiation ranges of first laser light in a vertical direction and a horizontal direction and a revolution angle of a direction of emission of the first laser light. Hence, a description(s) thereof will be omitted herein.

A difference from FIG. 5 is an elevation angle of a direction of emission of second laser light emitted from the laser light projecting and receiving part 121 and an irradiation range 1323 on a road.

As illustrated in FIG. 13(a), an elevation angle of a direction of emission of second laser light emitted from the laser light projecting and receiving part 121 (an angle around an x-axis) is set in such a manner that an irradiation range 1320 of the second laser light is included in the image taking range 510 of the stereo camera part 110. Moreover, a center line 1322 of the irradiation range 1320 is set to be at an angle $\theta_{vR2}$ in a downward direction with respect to the straight line 502. Here, $\theta_{vR2}$ is a value that is greater than zero and greater than an angle of an optical axis of the monocular camera part 111 or 112 with respect to the straight line 502 and $\theta_{vR} > \theta_{vR2}$ is provided. That is, an optical axis of second laser light is also directed downward with respect to an optical axis of the monocular camera part 111 or 112.

Here, although revolution angles of directions of emission of first and second laser light in an example of FIG. 13(b) (angles around a y-axis) are set in such a manner that the directions of emission of the first and second laser light are identical to that of an optical axis of the monocular camera part 111 or 112, the present invention is not limited thereto. Either one or both of directions of emission of first and second laser light may be set so as to be different from an optical axis of the monocular camera part 111 or 112.

Here, in a case where a road marking (the crosswalk 531) that is present at a position of $L_{c2}$ [m] in front of the vehicle 501 is detected as illustrated in FIG. 13(a), the following formula:

$$\theta_{vR2} = \tan^{-1}\left(\frac{H}{L_{c2}}\right) [\text{rad}] \quad \text{(Formula 4)}$$

is held.

Furthermore, it is possible to obtain a spread angle $\Delta\theta_{vR2}$ of the irradiation range 1320 of second laser light in a vertical direction (a direction of a y-axis) in accordance with the following formula:

$$\Delta\theta_{vR2} \approx \frac{H \cdot \Delta L_2}{L_{c2}^2} [\text{rad}] \quad \text{(Formula 5)}$$

wherein $\Delta L_2$ is a length of the irradiation range 1323 on the road 530 at a front side in a depth direction (a direction of a z-axis).

herein, where H=1.4 [m], $L_{C2}$=20 [m], $\theta_{vR2}$=0.07 [rad] (4 [degrees]), and $\Delta\theta_{vR2}$=0.028 [rad] (1.6 [degrees]) are provided, a length of the irradiation range 1323 on a road in a depth direction (a direction of a z-axis) is 4.0 [m]. That is, $\Delta L_2$=4.0 [m] is provided.

On the other hand, where a spread angle $\Delta\theta_{hR2}$ of the irradiation range 1321 of second laser light from the laser light projecting and receiving part 121 in a horizontal direction (a direction of an x-axis) is 6 [degrees], the irradiation range 1323 on a road in a horizontal direction is 2.0 [m].

Figure 14:
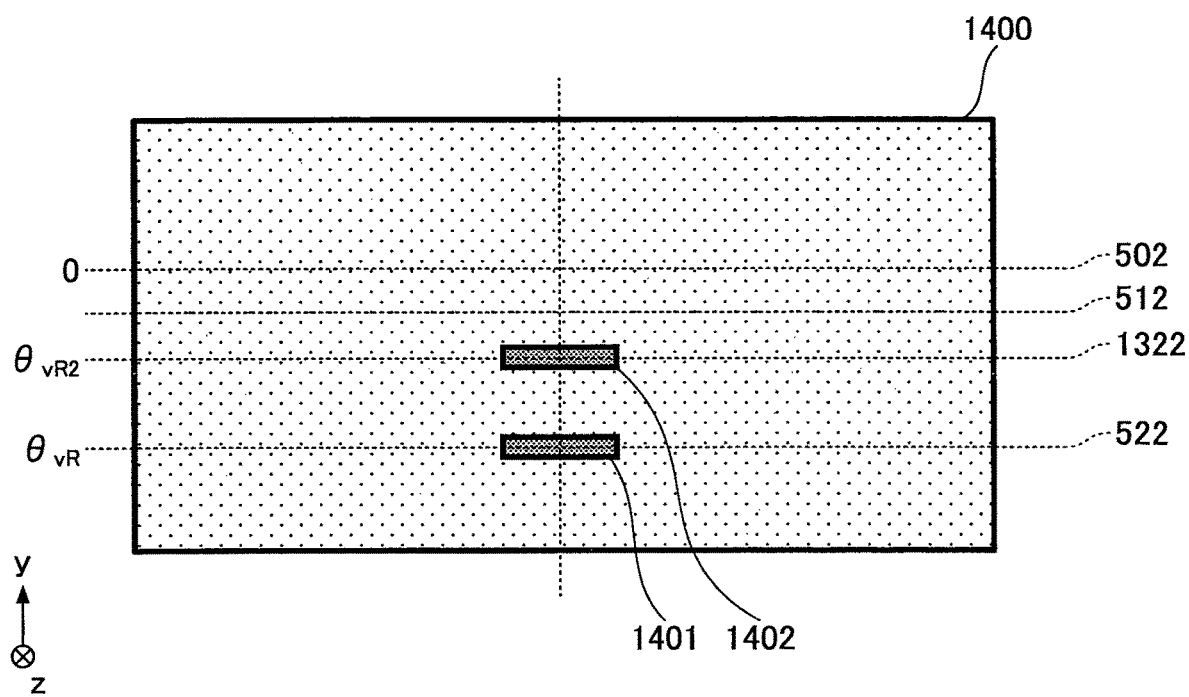
FIG. 14 is a diagram that illustrates a range irradiated with laser light (a range of irradiation on a road image) in a taken image that is taken by a stereo camera part.

FIG. 14 is a diagram that illustrates the irradiation ranges 523 and 1323 on a road in a case where first and second laser light is emitted from the laser light projecting and receiving part 121 on the setting described above, as irradiation range images 1401 and 1402 within a taken image 1400.

As illustrated in FIG. 14, the irradiation range image 1401 or 1402 is arranged (at a position that corresponds to an elevation angle $\theta_{vR2}$ or $\theta_{vR}$) under the center line 512 of the image taking range 510 in the taken image 1400 according to a setting method as illustrated in FIG. 13. Furthermore, arrangement is executed on a center line of the image taking range 511. In other words, an irradiation range is provided under an optical axis of the monocular camera part 111 or 112, and thereby, the irradiation range image 1401 or 1402 is arranged at a position of a rendered road.

Here, spread angles of irradiation ranges of first laser light and second laser light are identical to each other, and hence, the irradiation range images 1401 and 1402 are rendered with an identical size within taken image 1400.

As is clear from the above descriptions, a configuration is provided so as to emit a plurality of pulses of pulsed laser light, and thereby, it is possible to provide a plurality of irradiation ranges at, for example, different positions in a depth direction (a position close to and a position far from an own vehicle), within a taken image in one frame. From this result, it is possible to increase a frequency of changing of a parallax exploration range, and it is possible to further reduce a frequency of occurrence of an error.

A Third Embodiment

The second embodiment described above is configured in such a manner that a plurality of pulses of pulsed laser light are emitted wherein spread angles of irradiation ranges are set to be identical for a plurality of pulses of laser light while only the setting of elevation angles is changed.

Accordingly, a configuration is such that sizes of irradiation ranges on a road are different among a plurality of pulses of laser light. However, the present invention is not limited thereto, and for example, a configuration may be such that spread angles of irradiation ranges in a horizontal direction and a vertical direction are set in such a manner that sizes of irradiation ranges on a road are identical among a plurality of pulses of laser light (that is, a suitable size dependent on a road marking are provided).

Figure 15:
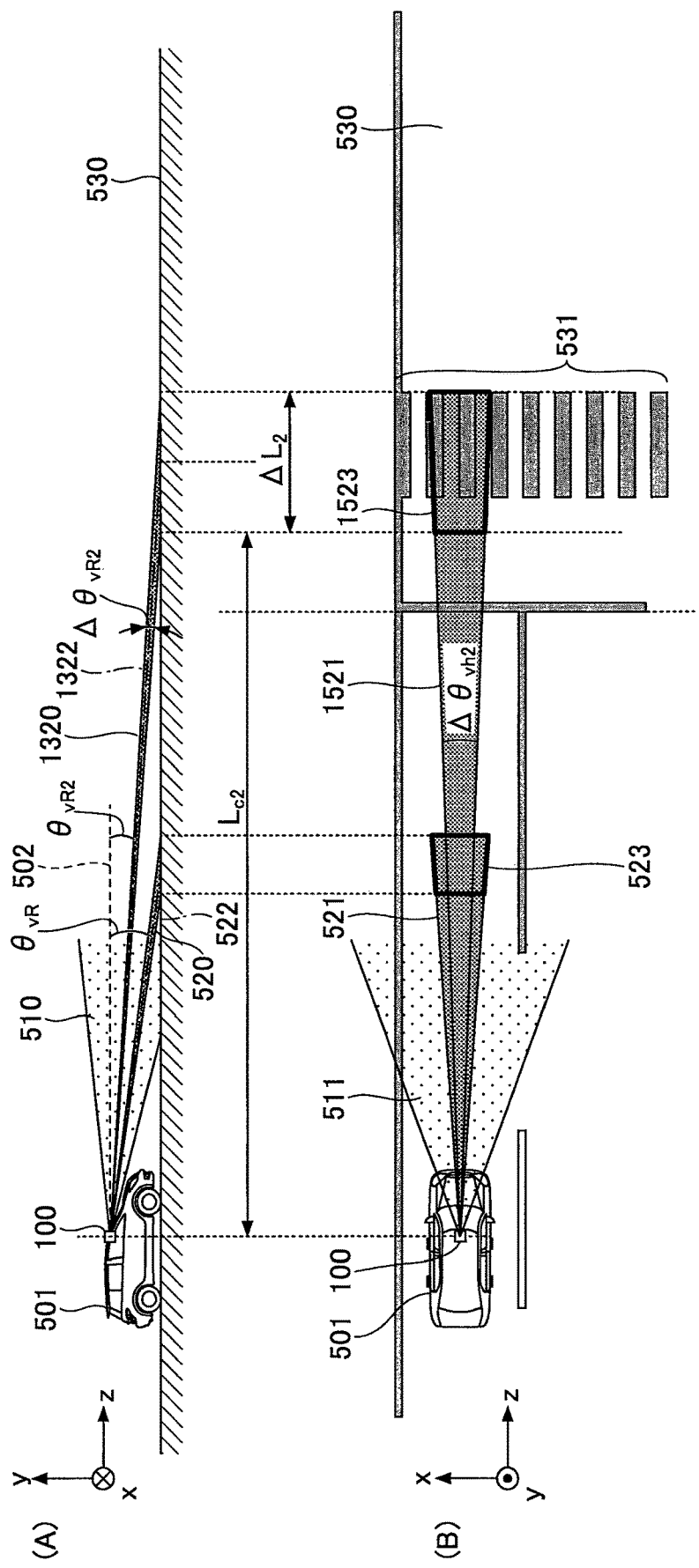
FIG. 15 is a diagram that illustrates a range image-taken by a stereo camera part that composes a parallax calculation system according to a third embodiment and a range of irradiation with laser light from a laser light projecting and receiving part.

FIG. 15 is a diagram that illustrates a method for setting the stereo camera part 110 and the laser light projecting and receiving part 121 that compose the parallax calculation system 100 according to the present embodiment in a case where a configuration is such that first and second laser light is emitted during image taking of a taken image in one frame. A method for setting the laser light projecting and receiving part 121 in the parallax calculation system 100 according to the present embodiment will be described will be described below, with reference to FIG. 15.

Here, a method for setting the stereo camera part 110 as illustrated in FIG. 15 is identical to that of the first embodiment described above, and hence, a description(s) thereof will be omitted below. Furthermore, an elevation angle and a revolution angle of a direction of emission of first laser light and spread angles of irradiation ranges in a vertical direction and a horizontal direction are also identical to those of FIG. 13, and hence, a description(s) thereof will be omitted below. Moreover, an elevation angle and a revolution angle of a direction of emission of second laser light are also identical to those of FIG. 13, and hence, a description(s) thereof will be omitted below.

<1. An Irradiation Range of Laser Light from a Laser Light Projecting and Receiving Part>

As illustrated in FIG. 15, spread angles $\Delta\theta_{vR2}$ and $\Delta\theta_{vh2}$ of irradiation ranges 1520 and 1521 of second laser light from the laser light projecting and receiving part 121 in a vertical direction and a horizontal direction are set in such a manner that a size of an irradiation range 1523 on a road is a suitable size dependent on a road marking. That is, a size of the irradiation range 1523 of second laser light on a road is set to be comparable with a size of the irradiation range of first laser light on the road.

Specifically, a spread angle $\Delta\theta_{vR2}$ of the irradiation range 1320 of second laser light in a vertical direction (a direction of a y-axis) is set at about 0.6 [degrees]. Furthermore, a spread angle $\Delta\theta_{vh2}$ of the irradiation range 1521 in a horizontal direction (a direction of an x-axis) is set at about 3 [degrees]. Thereby, the irradiation range 1523 on a road is such that a length in a horizontal direction is 1.0 [m] and a length in a vertical direction is 2.0 [m] (that is, $\Delta L_2 = 2.0$ [m] is provided).

Figure 16:
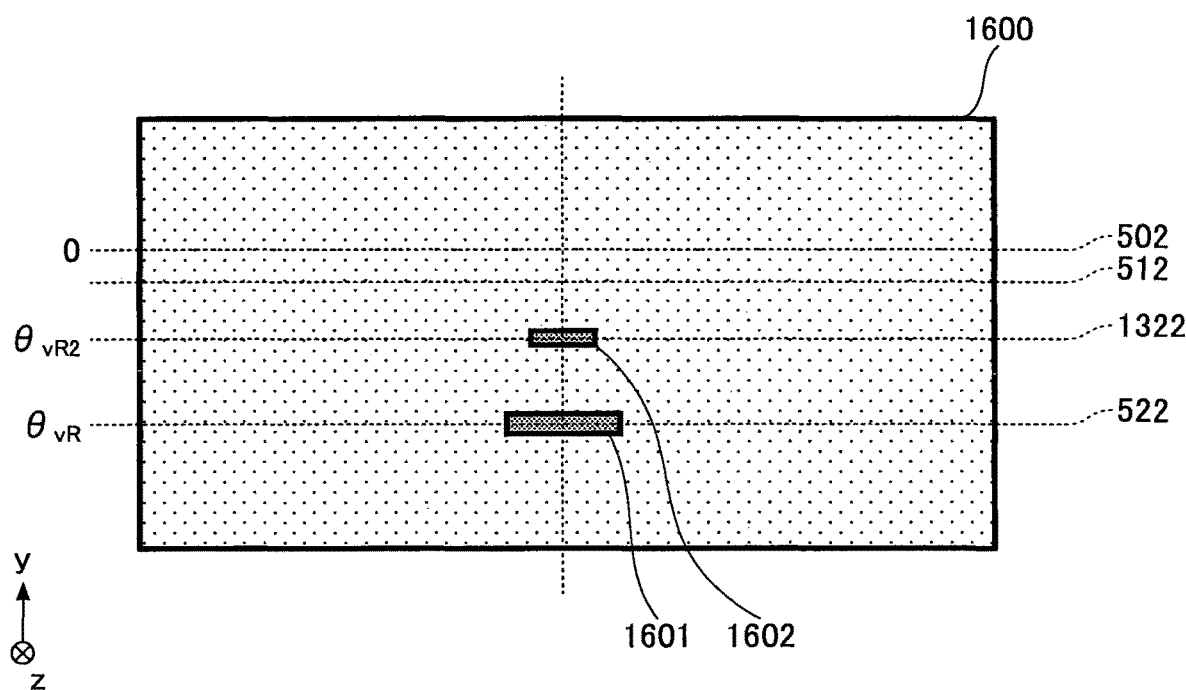
FIG. 16 is a diagram that illustrates a range of irradiation with laser light (a range of irradiation on a road image) in a taken image that is taken by a stereo camera part.

Here, FIG. 16 is a diagram that illustrates, as irradiation range images 1601 and 1602 within a taken image 1600, the irradiation ranges 523 and 1523 on a road in a case where first and second laser light are emitted from the laser light projecting and receiving part 121 on a setting as described above.

Because spread angles of irradiation ranges of first laser light and second laser light in a vertical direction and a horizontal direction are different from each other, the irradiation range images 1601 and 1602 with different heights and widths are rendered within the taken image 1600 as illustrated in FIG. 16.

<2. A Summary>

As is clear from the above descriptions, the parallax calculation system 100 according to the present embodiment is:

configured in such a manner that a plurality of pulses of pulsed laser light are emitted in a stereo camera part during image taking of a taken image in one frame; and configured in such a manner that spread angles of irradiation ranges of laser light in a horizontal direction and a vertical direction are set in such a manner that each of a plurality of irradiation ranges on a road is of a suitable size dependent on a road marking.

Thereby, it is possible for the parallax calculation system 100 according to the present embodiment to enjoy an effect of the first embodiment described above at a plurality of locations within a taken image. As a result, it is possible to reduce a frequency of occurrence of an error.

A Fourth Embodiment

Configurations for irradiating with a plurality of pulses of pulsed laser light during image taking of a taken image in one frame in a stereo camera part are described in the second and third embodiments described above. Then, a detail of a road measurement process in the laser radar distance measuring part 120 has been referred to, and for example, a configuration may be such that a road measurement process is executed with the laser radar distance measuring part 120 that is different with respect to a laser light receiving signal that is produced based on each reflected light.

Figure 17A:
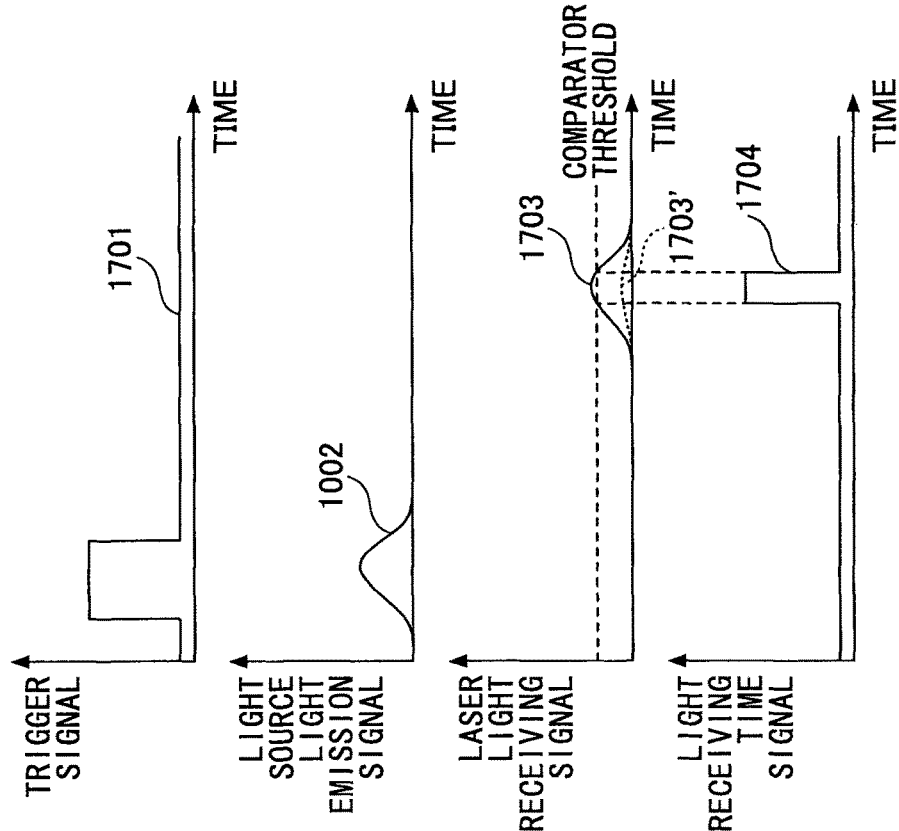
FIG. 17A and FIG. 17B are diagrams that illustrate each signal to be processed at a time of a road measurement process in a laser radar distance measuring part that composes a parallax calculation system according to a fourth embodiment.
Figure 17B:
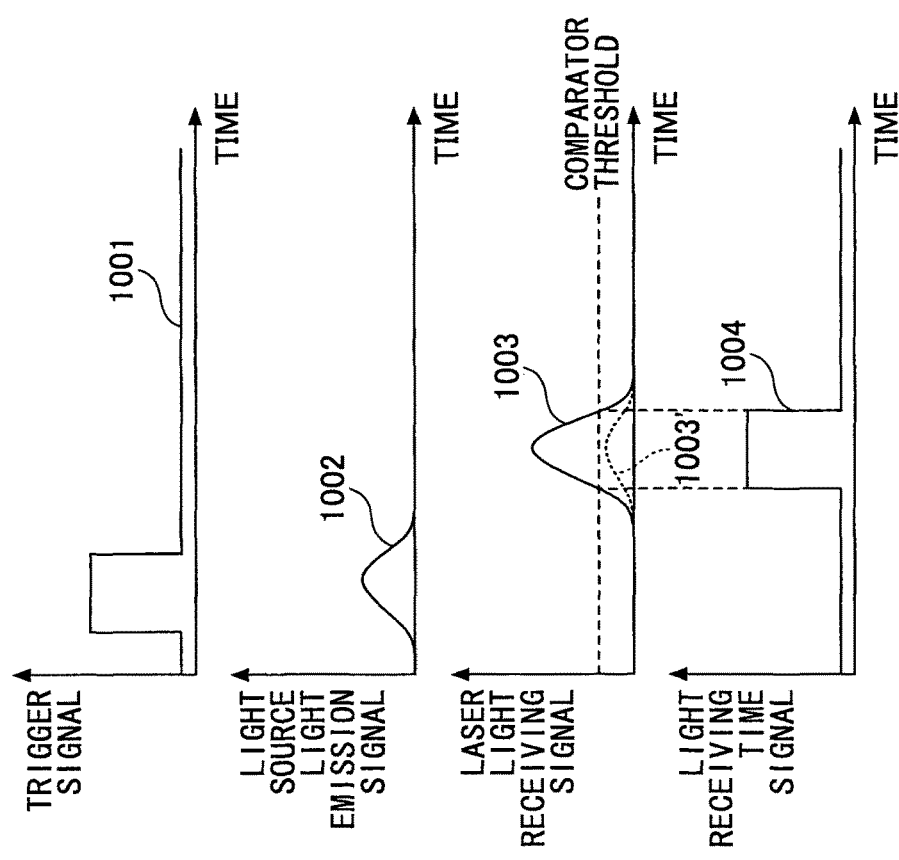

FIG. 17A and FIG. 17B illustrate a detail of each signal to be processed in the laser radar distance measuring part 120 of the parallax calculation system 100 according to the present embodiment. Here, FIG. 17A illustrates a case where a road marking is present in an irradiation range of first laser light on a road, and FIG. 17B illustrates a case where a road marking is present in an irradiation range of second laser light on a road. Among these, FIG. 17A is identical to FIG. 10A, and hence, a description(s) thereof will be described herein.

Herein, a reflection characteristic of a road marking is rarely changed even if a measurement distance (a distance from a position of emission of laser light) is different. Reflected light that is reflected from a road marking is normally diffused to all of orientations, and a part of such diffused light is received by the laser light projecting and receiving part 121. Hence, as a measurement distance is increased, an intensity of reflected light received by the laser light projecting and receiving part 121 is decreased (see a laser light receiving signal 1703 in FIG. 17B).

Therefore, a comparator threshold for determining presence or absence of a road marking based on reflected light of second laser light is set to be lower than a comparator threshold for determining presence or absence of a road marking based on reflected light of first laser light.

A comparator threshold illustrated in FIG. 17B illustrates a comparator threshold for determining presence or absence of a road marking based on reflected light of second laser light. Thus, different thresholds of a comparator are set for first laser light and second laser light, and thereby, it is possible to distinguish between a laser light receiving signal 1003' or 1703' in a case where a road marking is absent and a laser light receiving signal 1003 or 1703 in a case where a road marking is present. That is, it is possible to detect a light receiving time signal 1004 or 1704 and determine presence or absence of a road marking.

A Fifth Embodiment

Although a configuration of the fourth embodiment described above is such that a comparator threshold that is dependent on an intensity of each laser light receiving signal is set in such a manner that it is possible to determine presence or absence of a road marking based on each reflected light of multiple laser light, the present invention is not limited thereto.

For example, a configuration may be such that an intensity of each light source light emission signal of multiple laser light is changed depending on each measurement distance for multiple laser light in such a manner that it is possible to set a common comparator threshold.

Herein, for a method for changing an intensity of light emission of a light source for multiple laser light, a method as follows is provided.

In a case where a plurality of laser light projecting and receiving parts are installed, an intensity of light emission of a light source of each laser light projecting and receiving part is set independently.

In a case where a configuration is such that a laser light scanning device is disposed in a laser light projecting and receiving part and pulsed laser light is emitted at each scanning position, an applied electric current (a light source light emission signal) is changed at each scanning position.

In a case where a beam is divided by a beam splitter, a ratio of light amount branching is controlled.

FIG. 18A and FIG. 18B are diagrams for illustrating each signal to be processed in the laser radar distance measuring part 120 in a case where a configuration is such that multiple pulsed laser light (first laser light and second laser light) is emitted during image taking of a taken image in one frame.

Among these, FIG. 18A is identical to FIG. 17A, and hence, a description(s) thereof will be described herein.

As illustrated in FIG. 18B, an intensity $P_2$ of a light source light emission signal 1802 of second laser light to be produced based on a trigger signal 1701 is greater than an intensity $P_1$ of the light source light emission signal 1002 of first laser light to be produced based on a trigger signal 1701. Thereby, an intensity of a laser light receiving signal 1803 in a case where a road marking is present in an irradiation range on a road irradiated with second laser light is generally identical to an intensity of the laser light receiving signal 1003 in a case where a road marking is present in an irradiation range on a road irradiated with first laser light.

As a result, it is possible to set a comparator threshold for determining presence or absence of a road marking based on the laser light receiving signal 1003 and a comparator threshold for determining presence or absence of a road marking based on the laser light receiving signal 1803 at generally equal values.

A Sixth Embodiment

Configurations in the second to fifth embodiments described above are such that a plurality of light-receiving elements are arranged in the laser light projecting and receiving part 121 in accordance with a configuration a plurality of pulses of pulsed laser light are emitted. However, the present invention is not limited thereto, and may be configured in such a manner that common light-receiving elements are provided in the laser light projecting and receiving part 121 and reflected light for a plurality of pulses of laser light emitted during image taking of a taken image in one frame are received by such common light receiving elements.

Herein, in a case where a configuration is such that reflected light for a plurality of pulses of laser light is received by common light receiving elements, it is necessary to control a pulse width in such a manner that it is possible to distinguish between and detect respective reflected light.

Then, a pulse width will be studied below, wherein a distance $L_{c1}$ of an irradiation range on a road irradiated with first laser light is 10 m and a distance $L_{c2}$ of an irradiation range on a road irradiated with second laser light is 20 m.

FIG. 19 is a diagram that illustrates each signal to be processed in the laser radar distance measuring part 120 in a case where reflected light is received by using common light receiving elements wherein a distance $L_{c1}$ is 10 m and a distance $L_{c2}$ is 20 m.

Here, an example of FIG. 19 is such that light source light emission intensities $P_1$ and $P_2$ for first and second laser light are set in such a manner that an intensity of the laser light receiving signal 1003 based on first laser light is identical to an intensity of the laser light receiving signal 1803 based on second laser light.

Herein, a period of time required for back and forth traveling to an irradiation range on a road irradiated with laser light will be referred to as a "laser light receiving time" and periods of time required for back and forth traveling to an irradiation range on a road irradiated with each of first and second laser light will be referred to as laser light receiving times $T_1$ and $T_2$.

In a case where a difference between a distance of an irradiation range on a road irradiated with first laser light (a first measurement distance) and a distance of an irradiation range on a road irradiated with second laser light (a second measurement distance) is 10 m, a difference between laser light receiving times $(T_2-T_1)$ is about 67 nsec. Therefore, it is desirable for a pulse width $t_p$ to be less than or equal to a difference between laser light receiving times ($T_2-T_1$) (for example, less than or equal to about 40 nsec) in order to distinguish between and detect the laser light receiving signal 1003 and the laser light receiving signal 1803.

Thus, in a case where a configuration is such that reflected light for a multiple pulsed laser light is received by common light receiving elements, a pulse width is set depending on a difference between laser light receiving times, and thereby, it is possible to distinguish between and detect respective reflected light.

A Seventh Embodiment

Configurations in the first to sixth embodiments described above are provided in such a manner that presence or absence of a road marking is determined depending on whether or hot an intensity of a laser light receiving signal is greater than or equal to a predetermined threshold. However, not all light receiving time signals detected based on a laser light receiving signal that has an intensity greater than or equal to a detected predetermined threshold are caused by a road marking.

On the other hand, pulsed laser light emitted from the laser light projecting and receiving part 121 reaches the road 530 and is reflected from the road 530 in a case where an obstacle is not present on an optical path. Therefore, it is possible to calculate a laser light receiving time for a detected light receiving time signal caused by a road marking preliminarily based on a measurement distance. That is, it is possible to determine whether or not a detected light receiving time signal is caused by a road marking by referring to a preliminarily calculated laser light receiving time (that will be referred to as "$T_{ref}$" herein).

For example, a light receiving time signal is detected at a timing that is different from a laser light receiving time $T_{ref}$ that is preliminarily calculated based on a measurement distance. In such a case, it is possible to determine that such a light receiving time signal is not a light receiving time signal produced by receiving light reflected from the road 530.

In other words, the laser signal processing part 122 determines whether or not a laser light receiving time (that is T herein) is approximately equal to a laser light receiving time $T_{ref}$ calculated depending on a measurement distance, in a case where a light receiving time signal is detected. Then, in a case where determination is provided as being approximately equal, determination is provided in such a manner that such a light receiving time signal is a light receiving time signal produced by being reflected from a road marking. On the other hand, even in a case where a light receiving time signal is detected, determination is provided in such a manner that when a laser light receiving time T is greatly different from a laser light receiving time $T_{ref}$ calculated depending on a measurement distance, such a light receiving time signal is not produce by being reflected from a road marking.

A flow of a process for determining presence or absence of a road marking in the laser radar distance measuring part 120 that composes the parallax calculation system 100 according to the present embodiment (a process that corresponds to S903 to S905 in FIG. 9) will be described below, in accordance with a flowchart in FIG. 20 and with reference to FIG. 21.

Figure 20:
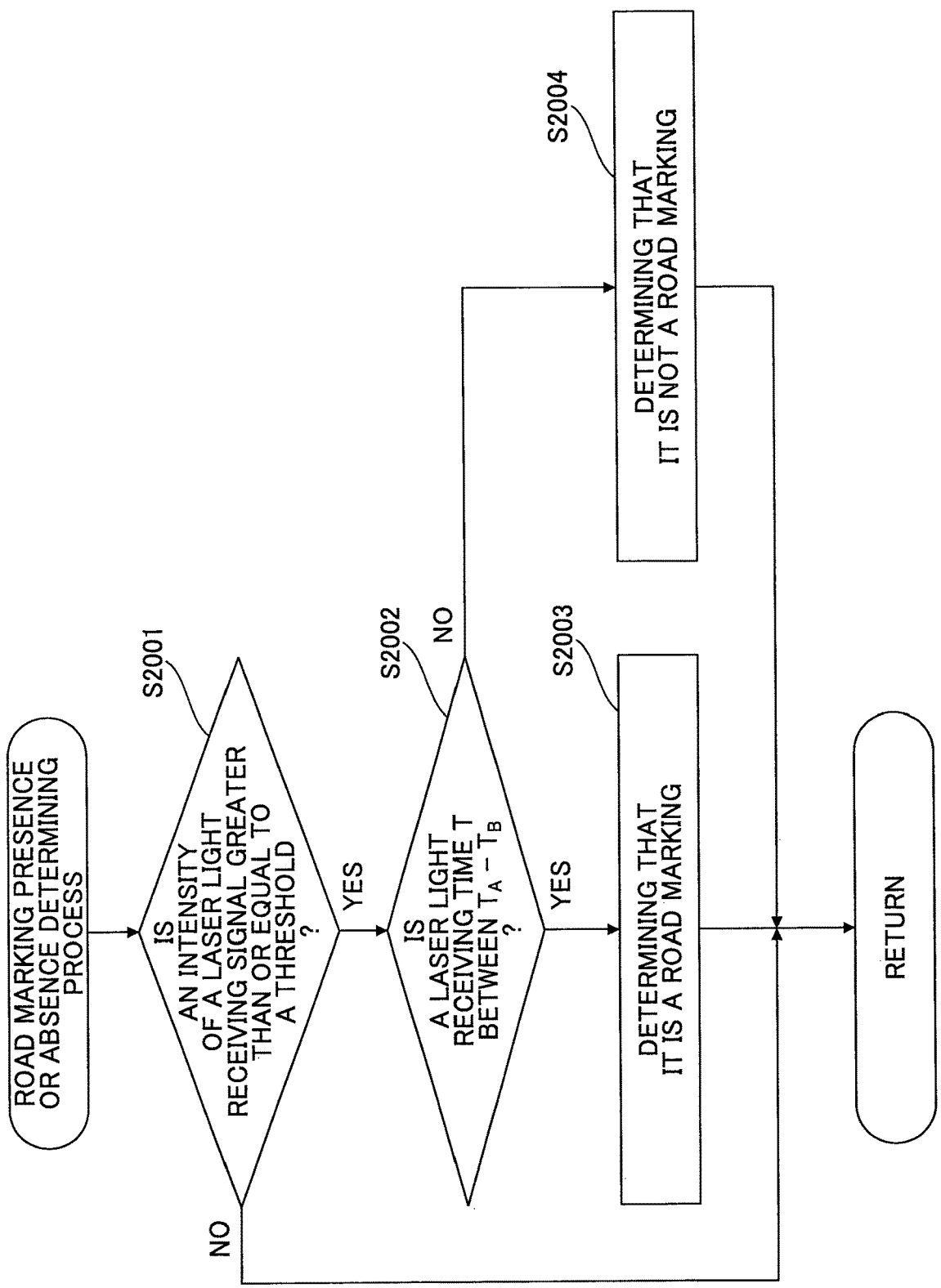
FIG. 20 is a flowchart that illustrates a flow of a road marking presence or absence determination process in a laser radar distance measuring part that composes a parallax calculation system according to a seventh embodiment.
Figure 21:
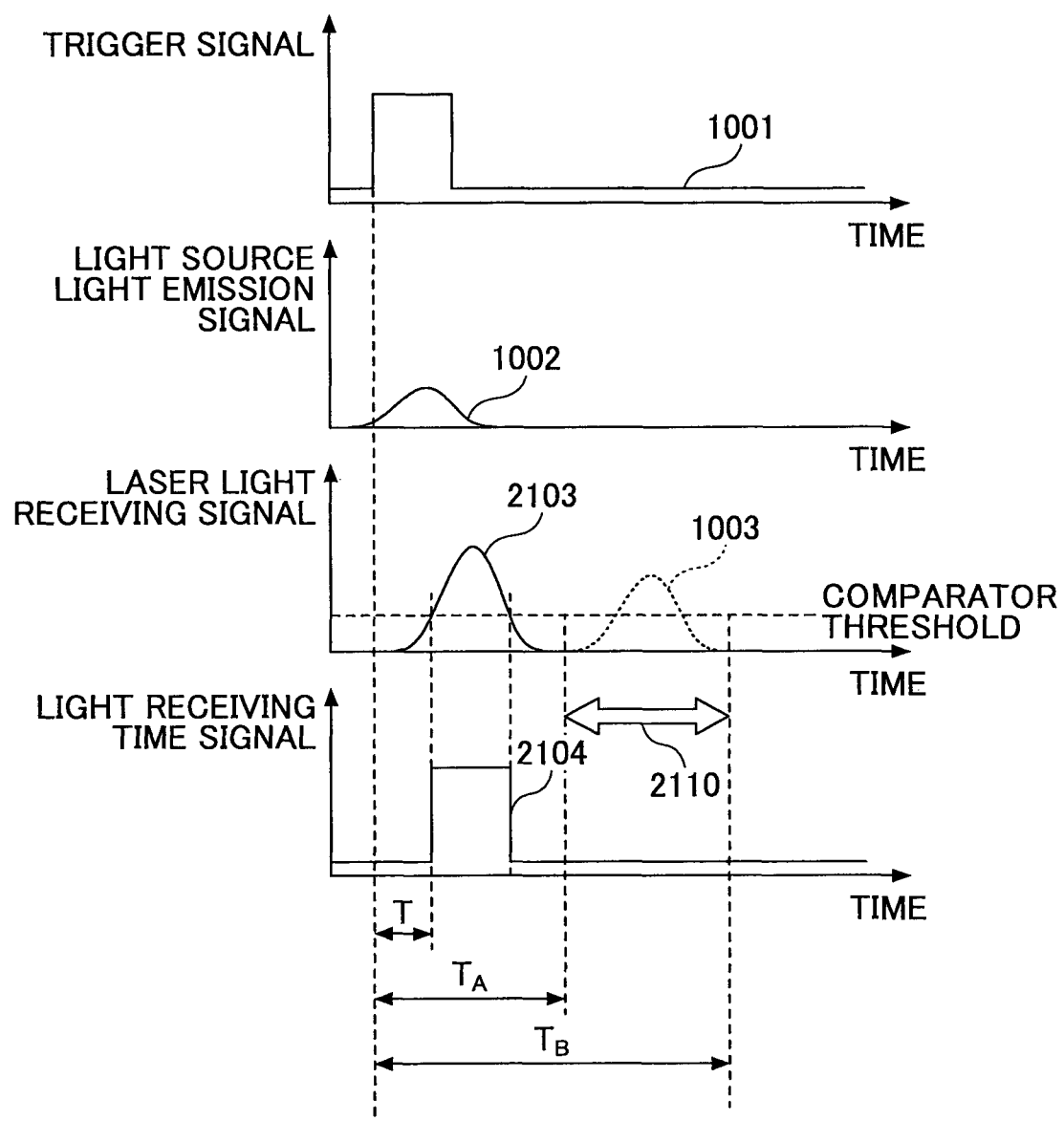
FIG. 21 is a diagram that illustrates each signal to be processed at a time of a road measurement process in a laser radar distance measuring part that composes a parallax calculation system according to a seventh embodiment.

FIG. 20 is a flowchart that illustrates a flow of a process for determining presence or absence of a road marking in the laser signal processing part 122 of the laser radar distance measuring part 120. FIG. 21 is a diagram that illustrates a detail of each signal to be processed in the laser radar distance measuring part 120.

In FIG. 20, at step S2001, the laser signal processing part 122 determines whether or not an intensity of a laser light receiving signal is greater than or equal to a threshold and a light receiving time signal 2104 is detected. In a case where a determination at step S2001 is provided in such a manner that the light receiving time signal 2104 is detected, going to step S2002 is executed.

At step S2002, the laser signal processing part 122 determines whether or not a laser light receiving time T of the light receiving time signal 2104 detected at step S2001 is present within a predetermined time range 2110 (between a time $T_A$ and a time $T_B$). At step S2002, in a case where a laser light receiving time T of the light receiving time signal 2104 is present within a predetermined time range (between a time $T_A$ and a time $T_B$), going to step S2003 is executed to determine that it is a road marking.

On the other hand, at step S2002, in a case where a laser light receiving time T of the light receiving time signal 2104 is absent within a predetermined time range 2110 (between a time $T_A$ and a time $T_B$), determination is provided in such a manner that it is not a road marking. In an example of FIG. 21, the light receiving time signal 2104 is absent within a predetermined time range 2110 (between a time $T_A$ and a time $T_B$), and hence, a determination is provided in such a manner that a produced light receiving time signal is not caused by a road marking.

As is clear from the above descriptions, it is possible to distinguish from a detected light receiving time signal caused by a road marking according to the present embodiment, even in a case where a laser light receiving signal greater than or equal to a comparator threshold is produced by a factor other than such a road marking to detect a light receiving time signal.

Thereby, it is possible to avoid a situation where presence or absence of a road marking is determined erroneously.

An Eighth Embodiment

Although a configuration in the seventh embodiment described above is such that whether or not it is a road marking is distinguished based on a laser light receiving time T of a light receiving time signal, the present invention is not limited thereto. For example, a configuration may be such that whether or not it is a road marking is distinguished based on an intensity range of a laser light receiving signal.

A flow of a process for determining presence or absence of a road marking on the laser signal processing part 122 in the parallax calculation system 100 according to the present embodiment will be described below, in accordance with a flowchart in FIG. 22 and with reference to FIG. 23.

Figure 22:
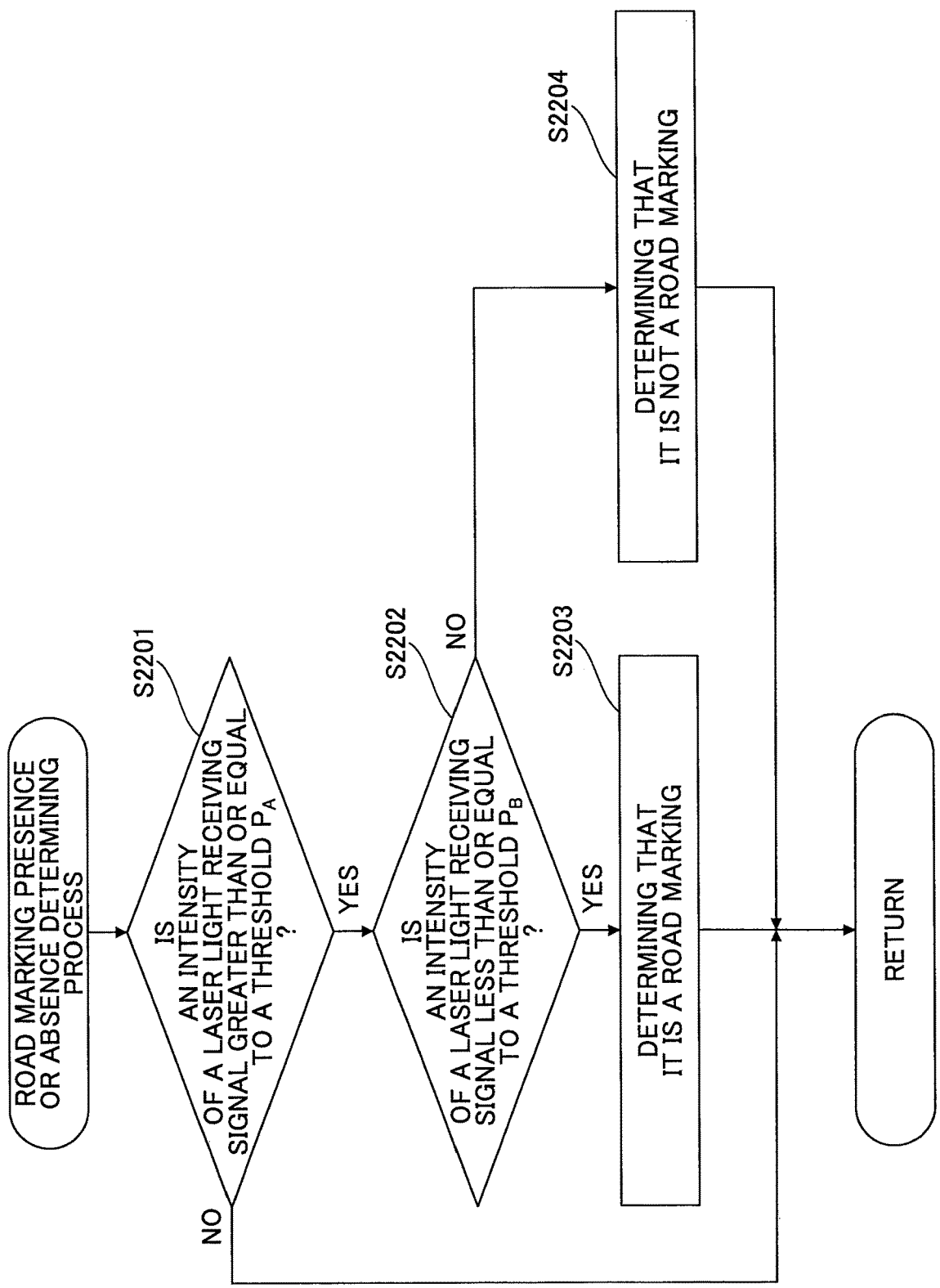
FIG. 22 is a flowchart that illustrates a flow of a road marking presence or absence determination process in a laser radar distance measuring part that composes a parallax calculation system according to an eighth embodiment.
Figure 23:
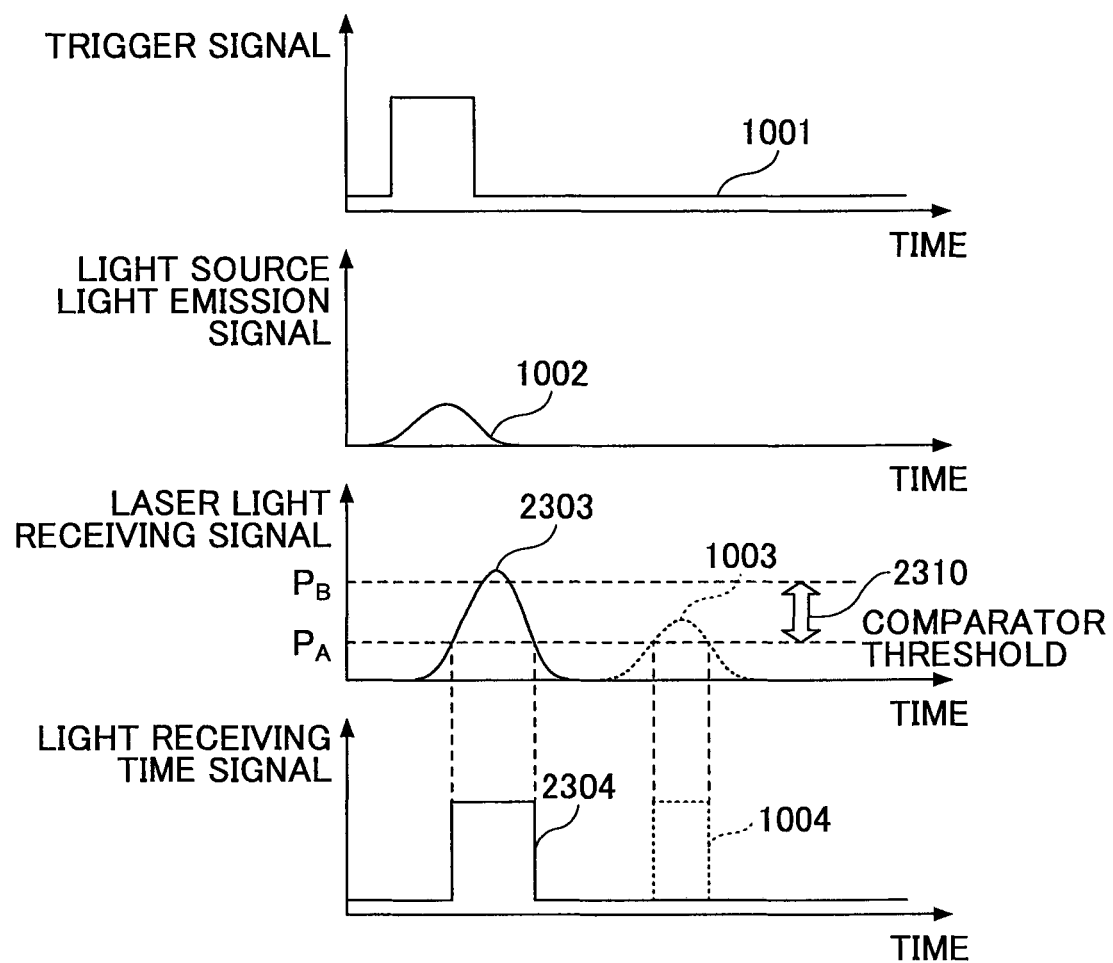
FIG. 23 is a diagram that illustrates each signal to be processed at a time of a road measurement process in a laser radar distance measuring part that composes a parallax calculation system according to an eighth embodiment.

FIG. 22 is a flowchart that illustrates a flow of a process for determining presence or absence of a road marking in the laser signal processing part 122. FIG. 23 is a diagram that illustrates a detail of each signal to be processed in the laser radar distance measuring part 120.

In FIG. 22, at step S2201, the laser signal processing part 122 determines whether or not a light receiving time signal 2304 is detected wherein an intensity of a laser light receiving signal is greater than or equal to a threshold $P_A$. In a case where determination at step S2201 is provided in such a manner that the light receiving time signal 2304 is detected, going to step S2202 is executed.

At step S2202, the laser signal processing part 122 determined whether or not an intensity of a laser light receiving signal 2303 that corresponds to the light receiving time signal 2304 is less than or equal to a threshold $P_B$ (That is, determination is provided as to whether or not it is present within a predetermined intensity range 2310). At step S2202, in a case where determination is provided in such a manner that an intensity of the laser light receiving signal 2303 that corresponds to the light receiving time signal 2304 is less than or equal to a threshold $P_B$ (that is, a case where it is present within the predetermined intensity range 2310), going to step S2203 is executed to determine that it is a road marking.

On the other hand, in a case where determination at step S2202 is provided in such a manner that an intensity of a laser light receiving signal that corresponds to the light receiving time signal 2304 is less than or equal to a threshold $P_B$, determination is provided in such a manner that it is not a road marking. In an example of FIG. 23, an intensity of the laser light receiving signal 2303 is not less than or equal to a threshold $P_B$, and hence, determination is provided in such a manner that a produced light receiving time signal is not caused by a road marking.

As is clear from the above descriptions, it is possible to distinguish from a transmitted light receiving time signal caused by a road marking according to the present embodiment, even in a case where a laser light receiving signal greater than or equal to a comparator threshold is produced by a factor other than a road marking and thereby a light receiving time signal is detected.

Thereby, it is possible to avoid determination as to presence or absence of a road marking erroneously.

Here, although the above descriptions are provided for a configuration for distinguishing whether or not it is a road marking by using only an intensity range of a laser light receiving signal, such a configuration may be combined with the seventh embodiment described above. That is, a configuration may be such that a road marking is determined in a case where a light receiving time signal is present within a predetermined time range and an intensity of a laser light receiving signal is present within a predetermined intensity range.

Other Embodiments

Although each embodiment described above is configured in such a manner that a parallax exploration range is changed for a pixel near an irradiation range image in a case where a determination is provided in such a manner that a road marking is present, the present invention is not limited thereto. For example, a configuration may be such that a parallax exploration range is changed for a pixel that is present at a position away from an irradiation range image in a taken image wherein the pixel is present at a height identical to that of such irradiation range image.

Although each embodiment described above is configured in such a manner that a light receiving time signal as a result of light receiving (a result of determination) is output based on reflected light in a case where laser light is emitted from the laser radar distance measuring part 120, the present invention is not limited thereto. A configuration may be such that a signal receiving time signal as a result of signal receiving (a result of determination) is output based on a reflected wave in a case of irradiation with an electromagnetic wave from an electromagnetic wave distance measuring part other than a laser radar distance measuring part.

In this case, an electromagnetic wave emission part for emitting an electromagnetic wave instead of the laser light source 222 is disposed and a reflected wave receiving part for receiving a reflected wave of an electromagnetic wave is provided instead of the light receiving element 225.

Furthermore, although each embodiment described above is configured in such a manner that a parallax image is output from the image processing part 130, the present invention is not limited thereto. For example, a configuration may be such that a distance of an object (a measurement object) is calculated based on a produced parallax image to output distance information. In this case, the image processing part 130 functions as a first distance information acquisition part and the laser signal processing part 122 functions as a second distance information acquisition part. Furthermore, the parallax calculation system 100 functions as a distance measurement device.

Here, a configuration provided in the embodiment described above or the like in combination with another element or the like may be provided, and the present invention is not limited to a configuration illustrated herein. It is possible to change these points in a range that does not depart from the spirit of the present invention and it is possible to determine appropriately depending on an application thereof.

APPENDIX

<An Illustrative Embodiment(s) of a Parallax Calculation System and a Distance Measuring Device>

At least one illustrative embodiment of the present invention may relate to a parallax calculation system and a distance measuring device.

At least one illustrative embodiment of the present invention may be provided by taking a problem as described above into consideration and aim at detecting a cause of occurrence of an error in a case where parallax calculation is executed by using a taken image that is taken by using a plurality of image taking parts.

According to at least one illustrative embodiment of the present invention, there may be provided a distance measuring device that has a configuration as provided below. That is, there may be provided a distance measuring device characterized by having a plurality of image taking parts, a first distance information acquisition part that acquires distance information of an object for distance measuring from a taken image that is taken by the plurality of image taking parts, an electromagnetic wave emission part that emits an electromagnetic wave, a reflected-wave receiving part that receives a reflected wave of an electromagnetic wave emitted from the electromagnetic wave emission part, and a second distance information acquisition part that acquires distance information of the object for distance measuring from a reflected wave received by the reflected-wave receiving part, wherein irradiation with an electromagnetic wave emitted from the electromagnetic wave emission part is executed under optical axes of the plurality of image taking parts.

Illustrative embodiment (1) is a distance measuring device, wherein the distance measuring device is characterized by having a plurality of image taking parts, a first distance information acquisition part that acquires distance information of an object for distance measuring from taken images that are taken by the plurality of image taking parts, an electromagnetic wave emission part that emits an electromagnetic wave, a reflected-wave receiving part that receives a reflected wave of an electromagnetic wave emitted from the electromagnetic wave emission part, and a second distance information acquisition part that acquires distance information of the object for distance measuring from a reflected wave received by the reflected-wave receiving part, wherein irradiation with an electromagnetic wave emitted from the electromagnetic wave emission part is executed under optical axes of the plurality of image taking parts.

Illustrative embodiment (2) is the distance measuring device as described in illustrative embodiment (1), characterized by further having a determination part that determines presence or absence of a road marking at a position irradiated with the electromagnetic wave based on a reflected wave received by the reflected-wave receiving part, wherein the first distance information acquisition part executes parallax calculation dependent on a result of determination by the determination part to acquire the distance information.

Illustrative embodiment (3) is the distance measuring device as described in illustrative embodiment (2), characterized in that a parallax exploration range is changed depending on a result of determination by the determination part in a case where parallax exploration is executed for the parallax calculation.

Illustrative embodiment (4) is the distance measuring device as described in illustrative embodiment (3), characterized in that the parallax exploration range in a case where the determination part determines that a road marking is present is set to be narrower than a case where the determination part determines that a road marking is absent.

Illustrative embodiment (5) is the distance measuring device as described in any one of illustrative embodiments (1) to (4), characterized in that while the plurality of image taking parts take taken images for one frame, the electromagnetic wave emission part irradiates a plurality of objects for distance measuring with electromagnetic waves and the reflected-wave receiving part receives reflected waves.

Illustrative embodiment (6) is the distance measuring device as described in illustrative embodiment (5), characterized in that the electromagnetic wave emission part is set in such a manner that irradiation ranges are approximately equal magnitudes in a case where the plurality of objects for distance measuring that are present at mutually different distances are respectively irradiated with the electromagnetic waves.

Illustrative embodiment (7) is the distance measuring device as described in illustrative embodiment (6), characterized in that the electromagnetic wave emission part is set in such a manner that intensities of reflected waves received from the plurality of objects for distance measuring respectively are approximately equal magnitudes.

Illustrative embodiment (8) is the distance measuring device as described in any one of illustrative embodiments (5) to (7), characterized in that the electromagnetic wave emission part sets pulse widths of pulsed electromagnetic waves that irradiate the plurality of objects for distance measuring, depending on a difference between respective distances of the plurality of objects for distance measuring.

Illustrative embodiment (9) is the distance measuring device as described in illustrative embodiment (2), characterized in that the determination part determines presence or absence of the road marking based on an intensity of a reflected wave received by the reflected-wave receiving part.

Illustrative embodiment (10) is the distance measuring device as described in illustrative embodiment (2), characterized in that the determination part determines presence or absence of the road marking based on whether or not a timing of determination that an intensity of a reflected wave received by the reflected-wave receiving part is greater than or equal to a predetermined threshold is included in a predetermined period of time.

Illustrative embodiment (11) is a parallax calculation system that executes parallax calculation based on taken images that are taken by a plurality of image taking parts, wherein the parallax calculation system is characterized by having a measuring means that irradiates with an electromagnetic wave, and receives a reflected wave from, an area as an irradiation object that is rendered as a road image in the taken images by taking images of a road surface positioned in image taking directions for the plurality of image taking parts, and a determination means that determines presence or absence of a road marking in the irradiation object based on a result of receiving in the measuring means, wherein the parallax calculation dependent on a result of determination by the determination means is executed.

Illustrative embodiment (12) is the parallax calculation system as described in illustrative embodiment (11), characterized in that the a parallax exploration range is changed depending on a result of determination by the determination means in a case where parallax exploration is executed for the parallax calculation.

Illustrative embodiment (13) is the parallax calculation system as described in illustrative embodiment (12), characterized in that the parallax exploration range in a case where the determination means determines that a road marking is present is set to be narrower than a case where the determination means determines that a road marking is absent.

Illustrative embodiment (14) is the parallax calculation system as described in any one of illustrative embodiments (11) to (13), characterized in that while the plurality of image taking parts take taken images for one frame, the measurement means irradiates a plurality of irradiation objects with electromagnetic waves and receives reflected waves.

Illustrative embodiment (15) is the parallax calculation system as described in illustrative embodiment (14), characterized in that the measurement means is set in such a manner that irradiation ranges are approximately equal magnitudes in a case where the plurality of irradiation objects that are present at mutually different distances are respectively irradiated with the electromagnetic waves.

Illustrative embodiment (16) is the parallax calculation system as described in illustrative embodiment (15), characterized in that the measurement means is set in such a manner that intensities of reflected waves received from the plurality of irradiation objects respectively are approximately equal magnitudes.

Illustrative embodiment (17) is the parallax calculation system as described in any one of illustrative embodiments (14) to (16), characterized in that the measurement means sets pulse widths of pulsed electromagnetic waves that irradiate the plurality of irradiation objects, depending on a difference between respective distances of the plurality of irradiation objects.

Illustrative embodiment (18) is the parallax calculation system as described in any one of illustrative embodiments (11) to (17), characterized in that the determination means determines presence or absence of the road marking based on an intensity of a reflected wave received by the measurement means.

Illustrative embodiment (19) is the parallax calculation system as described in any one of illustrative embodiments (11) to (18), characterized in that the determination means determines presence or absence of the road marking based on whether or not a timing of determination that an intensity of a reflected wave received by the measurement means is greater than or equal to a predetermined threshold is included in a predetermined period of time.

According to at least each illustrative embodiment of the present invention, it may be possible to detect a cause of occurrence of an error in a case where parallax calculation is executed by using taken images that are taken by using a plurality of image taking parts.

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

The present application claims the benefit of priority based on Japanese Patent Application No. 2014-033681 filed on Feb. 25, 2014 and Japanese Patent Application No. 2015-030368 filed on Feb. 19, 2015, the entire contents of which are herein incorporated by reference.

The invention claimed is:

1. A distance measuring device, comprising:
a plurality of image taking parts;
first circuitry configured to acquire first distance information of an object for distance measuring from taken images that are taken by the plurality of image taking parts such that irradiation with an electromagnetic wave is executed under optical axes of the plurality of image taking parts;
an electromagnetic wave emitter to emit the electromagnetic wave;
a reflected-wave receiver to receive a reflected wave of the electromagnetic wave emitted from the electromagnetic wave emitter; and
second circuitry configured to acquire second distance information of the object for distance measuring from the reflected wave received by the reflected-wave receiver, and determine presence or absence of a road marking at a position irradiated with the electromagnetic wave based on the reflected wave received by the reflected-wave receiver,
wherein the first circuitry is further configured to execute a parallax calculation dependent on a result of the determination by the second circuitry, to acquire the first distance information.

2. The distance measuring device as claimed in claim 1, wherein the first circuitry is further configured to change a parallax exploration range depending on a result of the determination by the second circuitry when parallax exploration is executed for the parallax calculation.

3. The distance measuring device as claimed in claim 2, wherein the first circuitry is further configured to set the parallax exploration range to be narrower when the second circuitry determines that the road marking is present than when the second circuitry determines that the road marking is absent.

4. The distance measuring device as claimed in claim 1, wherein while the plurality of image taking parts take taken images for one frame, the electromagnetic wave emitter irradiates a plurality of objects for distance measuring with electromagnetic waves and the reflected-wave receiver receives reflected waves.

5. The distance measuring device as claimed in claim 4, wherein the electromagnetic wave emitter is set in such a manner that irradiation ranges are approximately equal in magnitude when the plurality of objects for distance measuring that are present at mutually different distances are respectively irradiated with the electromagnetic waves.

6. The distance measuring device as claimed in claim 5, wherein the electromagnetic wave emitter is set in such a manner that intensities of reflected waves received from the plurality of objects for distance measuring, respectively, are approximately equal in magnitude.

7. The distance measuring device as claimed in claim 4, wherein the electromagnetic wave emitter is configured to set pulse widths of pulsed electromagnetic waves that irradiate the plurality of objects for distance measuring, depending on a difference between respective distances of the plurality of objects for distance measuring.

8. The distance measuring device as claimed in claim 1, wherein the second circuitry is further configured to determine the presence or absence of the road marking based on an intensity of the reflected wave received by the reflected-wave receiver.

9. The distance measuring device as claimed in claim 1, wherein the second circuitry is further configured to determine the presence or absence of the road marking based on whether or not a timing of a determination that an intensity of the reflected wave received by the reflected-wave receiver is greater than or equal to a predetermined threshold is included in a predetermined period of time.

* * * * *